United States Patent
Sinha et al.

(10) Patent No.: US 10,788,229 B2
(45) Date of Patent: Sep. 29, 2020

(54) BUILDING MANAGEMENT SYSTEM WITH A DISTRIBUTED BLOCKCHAIN DATABASE

(71) Applicant: Johnson Controls Technology Company, Plymouth, MI (US)

(72) Inventors: Sudhi R. Sinha, Milwaukee, WI (US); Youngchoon Park, Brookfield, WI (US); Sajjad Pourmohammad, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 179 days.

(21) Appl. No.: 15/592,041

(22) Filed: May 10, 2017

(65) Prior Publication Data

US 2018/0328612 A1 Nov. 15, 2018

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
CPC ......... G06F 17/30138; G06F 17/30917; G06F 17/30528; G06F 17/30306;
(Continued)

(56) References Cited

U.S. PATENT DOCUMENTS 4,405,829 A 9/1983 Rivest et al.
5,231,338 A 7/1993 Bulgarelli et al.
(Continued)

FOREIGN PATENT DOCUMENTS

WO WO 2017/067587 4/2017

OTHER PUBLICATIONS

Herbert et al., A Novel Method for Decentralised Peer-to-Peer Software License Validation Using Cryptocurrency Blockchain Technology, Jan. 2015, Proceedings of the 38th Australasian Computer Science Conference (ACSC 2015), all pages. (Year: 2015).*
(Continued)

*Primary Examiner* — Jay A Morrison
*Assistant Examiner* — Antonio J Caiado
(74) *Attorney, Agent, or Firm* — Foley & Lardner LLP

(57) ABSTRACT

A system for securely communicating information in a building management system (BMS) includes a plurality of HVAC devices communicably coupled via a network each HVAC device storing a copy of an HVAC data chain that includes a plurality of blocks linked sequentially. The plurality of HVAC devices includes a first HVAC device including a processing circuit configured to generate a first block comprising device data and send the block to at least a portion of the plurality of HVAC devices. The processing circuit is configured to receive a second block from one of the plurality of HVAC devices and solve the second block. The processing circuit is further configured to add the solved block to the HVAC data chain of the first HVAC device as the newest block and send the solved block to each of the plurality of HVAC devices.

24 Claims, 16 Drawing Sheets

(51) Int. Cl.

| | | |
|---|---|---|
| F24F 11/63 | (2018.01) | |
| F24F 11/58 | (2018.01) | |
| G05D 23/19 | (2006.01) | |
| G05B 15/02 | (2006.01) | |
| H04L 29/06 | (2006.01) | |
| G06F 16/27 | (2019.01) | |

(52) U.S. Cl.
CPC ..... G05D 23/1917 (2013.01); G05D 23/1934 (2013.01); G06F 16/273 (2019.01); H04L 63/0428 (2013.01); H04L 63/0442 (2013.01); F24F 11/58 (2018.01); F24F 11/63 (2018.01); G05B 2219/25232 (2013.01); G05B 2219/2614 (2013.01); G05B 2219/36542 (2013.01)

(58) Field of Classification Search
CPC ......... G06F 17/30327; G06F 17/30345; G06F 17/30342; G06F 17/30371; G06F 17/30569; G06F 17/30622; G06F 17/30147; F24F 11/30; F24F 11/62; F24F 11/58; F24F 11/63; G05B 15/02; G05B 15/1917; G05B 2219/25232; G05B 2219/2614; G05B 2219/36542; G05D 23/1934; G05D 23/1917; H04L 63/0428; H04L 63/0442

See application file for complete search history.

(56) References Cited

U.S. PATENT DOCUMENTS

| | | | | |
|---|---|---|---|---|
| 5,231,668 | A | 7/1993 | Kravitz | |
| 8,860,569 | B2* | 10/2014 | Hruska | H04Q 9/00 340/539.1 |
| 10,055,554 | B2* | 8/2018 | Papa | G06F 21/105 |
| 2003/0040842 | A1* | 2/2003 | Poth | G05B 15/02 700/275 |
| 2008/0208754 | A1* | 8/2008 | Zunke | G06F 21/10 705/59 |
| 2010/0106814 | A1* | 4/2010 | Hadzidedic | H04L 12/2807 709/222 |
| 2012/0054201 | A1* | 3/2012 | Fischer | G06Q 10/06 707/748 |
| 2015/0332283 | A1 | 11/2015 | Witchey | |
| 2016/0027229 | A1* | 1/2016 | Spanos | G07C 13/00 705/51 |
| 2016/0259923 | A1* | 9/2016 | Papa | G06F 21/105 |
| 2016/0300234 | A1 | 10/2016 | Moss-Pultz et al. | |
| 2016/0350519 | A1 | 12/2016 | Pattyn et al. | |
| 2017/0011318 | A1 | 1/2017 | Vigano et al. | |
| 2017/0013047 | A1* | 1/2017 | Hubbard | H04L 67/20 |
| 2017/0103468 | A1* | 4/2017 | Orsini | G06Q 40/12 |
| 2017/0206523 | A1* | 7/2017 | Goeringer | G06F 21/45 |
| 2017/0230189 | A1* | 8/2017 | Toll | G06Q 40/04 |
| 2017/0302663 | A1* | 10/2017 | Nainar | H04W 4/70 |
| 2017/0359374 | A1* | 12/2017 | Smith | G06F 21/57 |
| 2018/0048485 | A1* | 2/2018 | Pelton | H04L 12/2829 |
| 2018/0052813 | A1* | 2/2018 | Laupretre | G06F 17/242 |
| 2018/0103042 | A1* | 4/2018 | Castagna | H04L 63/08 |
| 2018/0139186 | A1* | 5/2018 | Castagna | H04L 63/0428 |
| 2018/0189528 | A1* | 7/2018 | Hanis | G06Q 10/087 |
| 2018/0253745 | A1* | 9/2018 | Webster | G06Q 30/0207 |
| 2018/0287893 | A1* | 10/2018 | O'Brien | H04L 41/5048 |
| 2018/0323975 | A1* | 11/2018 | Curbera | G16H 10/60 |

OTHER PUBLICATIONS

Shang et al., Publish-Subscribe Communication in Building Management Systems over Named Data Networking, 2018, NDN, Technical Report NDN-0066, all pages. (Year: 2018).*
U.S. Appl. No. 15/367,167, filed Dec. 1, 2016, Johnson Controls Technology Company.
U.S. Appl. No. 15/586,104, filed May 3, 2017, Johnson Controls Technology Company.
PCT/US2017/030916, May 3, 2017, Johnson Controls Technology Company.
Block Hashing Algorithm, Bitcoin Wiki, https://en.bitcoin.it/wiki/Block_hashing_algorithm, retrieved on May 10, 2017, 3 pages.
Marino Electric, Emme Room-by-Room, http://marinoelectric.com/emme-how-it-works, retrieved on May 10, 2017, 3 pages.
Nakamoto, Bitcoin: A Peer-to-Peer Electronic Cash System, 2008, https://bitcoin.org/bitcoin.pdf, retrieved on May 10, 2017, 9 pages.
Snow et al., Business Processes Secured by Immutable Audit Trails on the Blockchain, Nov. 17, 2014, https://bravenewcoin.com/assets/Whitepapers/Factom-Whitepaper.pdf, retrieved on May 10, 2017, 38 pages.
Search Report for International Application No. PCT/US2017/051383, dated Mar. 21, 2018, 18 pages.

* cited by examiner

BUILDING MANAGEMENT SYSTEM WITH A DISTRIBUTED BLOCKCHAIN DATABASE

BACKGROUND

In device networks, a central server handles device identity confirmation, login requests, facilitates contracts between devices, and various other tasks. In a network such as this, the operation of the devices is often dependent on the central server. In short, the entire network relies on a single entity, the central server, and thus the entire network has a single point of failure. The entire device network can be disrupted by the central server ceasing to function properly. Since the entire network depends on the central server, a breach of the central server can disrupt the entire network by compromising the central server. Further, in instances when the central server crashes, goes offline, or experiences a fault, all of the devices that depend on the central server may cease to properly function even if the devices themselves are not experiencing a fault.

Further, various records or data for the device network can be stored in the central server. Each device of the network can rely on the integrity of the records stored in the central server. If the records stored by the central server become corrupted or compromised, the devices of the device network may unknowingly rely on corrupted or otherwise compromised data. Further, a compromised central server may result in maintenance costs for the central server and may increase required communication overhead because devices must communicate with the central server, rather than with each other.

SUMMARY

One implementation of the present disclosure is a system for securely communicating and storing information in a building management system (BMS). The system includes a HVAC devices communicably coupled via a network. Each of the HVAC devices are configured to store a copy of an HVAC data chain. The HVAC data chain includes blocks linked sequentially. The HVAC devices include a first HVAC device including a processing circuit configured to generate a first block including device data and send the block to at least a portion of the plurality of HVAC devices. The processing circuit is further configured to receive a second block from one of the plurality of HVAC devices. The second block includes different device data. The processing circuit is further configured to solve the second block by determining a nonce value that causes a hash of the different device data, the nonce value, and a previous hash of a newest block in the HVAC data chain to meet a difficulty requirement. The processing circuit is further configured to add the solved block to the HVAC data chain of the first HVAC device as the newest block and send the solved block to each of the plurality of HVAC devices to be added as the newest block in the HVAC data chain stored on each of the plurality of HVAC devices. The solved block includes the different device data and the determined nonce value.

In some embodiments, the blocks include HVAC data associated with zones of a building associated with the BMS. In some embodiments, the HVAC data chain further includes, based on the blocks, a record of HVAC data for the building.

In some embodiments, the processing circuit of the first HVAC device and a processing circuit of a second HVAC device of the HVAC devices are configured to determine an operating contract for the first HVAC device and the second HVAC device. In some embodiments, the processing circuit of the first HVAC device is configured to generate a block including the operating contract and send the block including the operating contract to the plurality of HVAC devices to be solved and added to the HVAC data chain stored on the plurality of HVAC devices.

In some embodiments, the first block generated by the processing circuit of the first HVAC device further includes a digital signature and a public key. In some embodiments, the processing circuit of the first HVAC device is configured to generate a digital signature for the first block with a private key and the HVAC data. In some embodiments, the second block further includes a second public key and a second digital signature. The processing circuit of the first HVAC device may be configured to verify the authenticity of the second block with the different HVAC data, the second digital signature, and the second public key.

In some embodiments, the processing circuit of the first HVAC device is configured to periodically update the difficulty requirement based on a target time, the target time may be the time for the plurality of HVAC devices to solve a predefined number of blocks. The target time may be based on the plurality HVAC devices being building security devices, building lighting devices, and devices that affect an environmental change in the building.

In some embodiments, the system further includes a licensing server including a processing circuit configured to receive a purchase for a software license for software for the first HVAC device, generate a block including a software license for the first HVAC device in response to receiving the purchase for the software license for the first HVAC device, and send the block including the software license for the first HVAC device to the plurality of HVAC devices to be added to the HVAC data chain stored on the plurality of HVAC devices.

In some embodiments, the processing circuit of the first HVAC device is configured to identify the software license based on the HVAC data chain.

In some embodiments, the processing circuit of the first HVAC device is further configured to perform, in response to identifying the software license, at least one of identifying a second HVAC device licensed for the software based on the HVAC data chain and send a request message to the second HVAC device for the software and sending the request message for the software to the licensing server.

In some embodiments, the second HVAC device includes a processing circuit configured to receive the request message from the first HVAC device, determine that the first HVAC device is licensed for the requested software based on the HVAC data chain indicating that the first HVAC device is licensed for the requested software, and send the requested software to the first HVAC device in response to determining that the HVAC data chain indicates that the first HVAC device is licensed for the requested software.

In some embodiments, the processing circuit of the first HVAC device is configured to generate an access request for HVAC data of a second HVAC device, and send the access request for the HVAC data to the second HVAC device. In some embodiments, the second HVAC device includes a processing circuit configured to receive the access request from the first HVAC device, generate a block authorizing the first HVAC device to request the HVAC data of the second HVAC device, and send the authorization block to the plurality of HVAC devices to be solved and added to the HVAC data chain stored on the plurality of HVAC devices. In some embodiments, the processing circuit of the first HVAC device is further configured to send a request for the HVAC data to the second HVAC device in response to determining that the first HVAC device is authorized to receive the building data.

In some embodiments, the processing circuit of the first HVAC device is configured to identify one of the plurality of the HVAC devices that have access to the HVAC data based on the HVAC data chain, send a request for the HVAC data to the identified HVAC device, and receive the HVAC data from the identified HVAC device. In some embodiments, the identified HVAC device includes a processing circuit configured to receive the request for the HVAC data from the first HVAC device, determine that the first HVAC device has access to the HVAC data based on the HVAC data chain, and send the HVAC data to the first HVAC device in response to determining that the first HVAC device has access to the HVAC data of the second HVAC device.

Another implementation of the present disclosure is a method for securely communicating and storing information among HVAC devices in a building management system (BMS). The method includes generating, by a first HVAC device, a first block including device data and send the block to at least a portion of the plurality of HVAC devices. The first HVAC device is one of the HVAC devices. The method further includes receiving, by the first HVAC device, a second block from one of the HVAC devices. The second block includes different device data. The method further includes solving, by the first HVAC device, the second block by determining a nonce value that causes hashing the different device data, the nonce value, and a previous hash of a newest block in an HVAC data chain to meet a difficulty requirement. Each of the HVAC devices store the HVAC data chain that includes a plurality of blocks linked sequentially. The method further includes adding, by the first HVAC device, the solved block to the HVAC data chain of the first HVAC device as the newest block and sending, by the first HVAC device, the solved block to each of the HVAC devices to be added to the HVAC data chain stored on each of the HVAC devices to be added as the newest block. The solved block includes the different device data and the determined nonce value.

In some embodiments, the blocks include HVAC data associated with zones of a building associated with the BMS. The HVAC data chain may further include, based on the blocks, a record of HVAC data for the building. In some embodiments, the blocks further include licensing information for the HVAC devices. In some embodiments, the HVAC data chain further includes, based on the blocks including licensing information, a record of licensing information for the HVAC devices.

In some embodiments, the method further includes determining, by the first HVAC device and a second HVAC device, an operating contract for the first HVAC device and the second HVAC device. In some embodiments, the method further includes generating, by the first HVAC device, a block including the operating contract and sending, by the first HVAC device, the block including the operating contract to the plurality of HVAC devices to be added to the HVAC data chain stored on the plurality of HVAC devices.

The first block may further include a digital signature and a public key. The method may further include generating, by the first HVAC device, the digital signature for the first block with a private key and the HVAC data. The second block may further include a second public key and a second digital signature. The method may further include verifying, by the first HVAC device, the authenticity of the second block with the different HVAC data, the second digital signature, and the second public key.

In some embodiments, the method further includes periodically updating, by the first HVAC device, the difficulty requirement based on a target time. The target time may be the time for the HVAC devices to solve a predefined amount of blocks and is based on the HVAC devices being building security devices, building lighting devices, and devices that affect an environmental change in the building.

In some embodiments, the method further includes receiving, by a license server, a purchase for a software license for software for the first HVAC device, generating, by the license server, a block including a software license for the first HVAC device in response to receiving the purchase for the software license for the first HVAC device, sending, by the license server, the block including the software license for the first HVAC device to the HVAC devices to be solved and added to the HVAC data chain stored on the plurality of HVAC devices, identifying, by the first HVAC device, the software license based on the HVAC data chain, and sending, by the first HVAC device, a request message for the software to the licensing server.

In some embodiments, the method further includes generating, by the first HVAC device, an access request for HVAC data of a second HVAC device, sending, by the first HVAC device, the access request for the HVAC data to the second HVAC device, receiving, by the second HVAC device, the access request from the first HVAC device, generating, by the second HVAC device, a block authorizing the first HVAC device to request the HVAC data of the second HVAC device, sending, by the first HVAC device, the block to the HVAC devices to be solved and added to the HVAC data chain stored on the plurality of HVAC devices, and sending, by the first HVAC device a request for the HVAC data to the second HVAC device.

In some embodiments, the method further includes identifying, by the first HVAC device, one of the plurality of the HVAC devices that have access to the HVAC data based on the HVAC data chain, sending, by the first HVAC device, a request for the HVAC data to the identified HVAC device, receiving, by the identified HVAC device, the request for the HVAC data from the first HVAC device, determining, by the identified HVAC device, that the first HVAC device has access to the HVAC data based on the HVAC data chain, sending, by the identified HVAC device, the HVAC data to the first HVAC device in response to determining that the first HVAC device has access to the HVAC data of the second HVAC device, and receiving, by the first HVAC device, the HVAC data from the one of the plurality of HVAC devices.

Another implementation of the present disclosure is a system for securely communicating and storing information in a building management system (BMS). The system includes a plurality of HVAC devices communicably coupled via a network. Each of the plurality of HVAC devices store a copy of an HVAC data chain including a plurality of data blocks linked sequentially. The plurality of HVAC devices include a first HVAC device including a processing circuit configured to generate a first block including device data, a public key, and a digital signature. The digital signature is generated based on the device data and a private key. The processing circuit is further configured to send the first block to the plurality of HVAC devices, receive a second block from one of the plurality of HVAC devices, the second block includes different device data, a second public key, and a second digital signature, verify the authenticity of the second block with the different HVAC data, the second signature, and the second public key, and solve the second block by determining a nonce value that causes hashing the different device data, the nonce value, and a previous hash of a newest block in the HVAC data chain to meet a difficulty requirement. The processing circuit is further configured to add the solved block to the HVAC data chain of the first HVAC device as the newest block and send the solved block to the plurality of HVAC devices to be added by each of the plurality of HVAC devices as the newest block in the HVAC data chain stored on each of the plurality of HVAC devices. The solved block includes the different device data and the determined nonce value.

In some embodiments, the plurality of blocks include HVAC data associated with zones of a building associated with the BMS. In some embodiments, the HVAC data chain further includes, based on the blocks, a record of HVAC data for the building. In some embodiments, the blocks further include licensing information for the plurality of HVAC devices. The HVAC data chain further includes, based on the blocks including licensing information, a record of licensing information for the HVAC devices.

In some embodiments, the processing circuit of the first HVAC device is configured to periodically update the difficulty requirement based on a target time, the target time may be the time for one of the HVAC devices to solve a predefined amount of blocks. In some embodiments, the target time is based on the HVAC devices being building security devices, building lighting devices, and devices that affect an environmental change in the building.

In some embodiments, the processing circuit of the first HVAC device and a processing circuit of a second HVAC device of the HVAC devices are configured to determine an operating contract for the first HVAC device and the second HVAC device. In some embodiments, the processing circuit of the first HVAC device is configured to generate a block including the operating contract and send the block including the operating contract to the HVAC devices to be solved and added to the HVAC data chain stored on the HVAC devices.

In some embodiments, the system further includes a licensing server including a processing circuit configured to receive a purchase for a software license for software for the first HVAC device, generate a block including the software license for the first HVAC device in response to receiving the purchase for the software license for the first HVAC device, and send the block including the software license for the first HVAC device to the HVAC devices to be solved and added to the HVAC data chain stored on the HVAC devices. In some embodiments, the processing circuit of the first HVAC device is configured to identify the software license based on the HVAC data chain. In some embodiments, the processing circuit of the first HVAC device is further configured to perform at least one of identify a second HVAC device licensed for the software based on the HVAC data chain and send a request message to the second HVAC device for the software and send the request message for the software to the licensing server. In some embodiments, the processing circuit of the second HVAC device is configured to receive the request message from the HVAC device, determine that the first HVAC device is licensed for the requested software based on the HVAC data chain indicating that the HVAC device is licensed for the requested software, and send the requested software to the first HVAC device in response to determining that the HVAC data chain indicates that the first HVAC device is licensed for the requested software.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
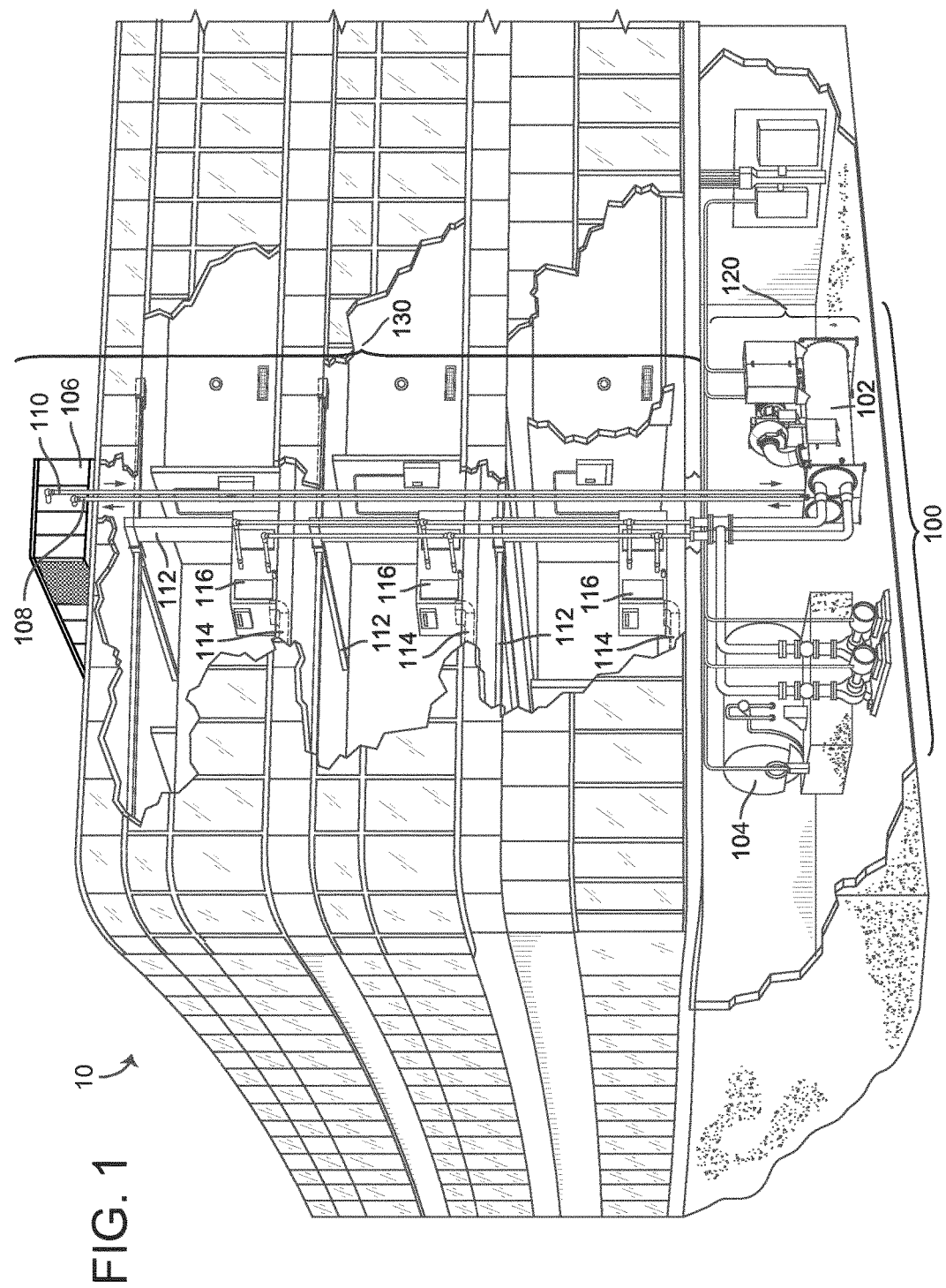
FIG. 1 is a schematic drawing of a building equipped with a HVAC system, according to some embodiments.

Referring generally to the FIGURES, systems and methods are shown for maintaining and utilizing a distributed HVAC data chain among a plurality of HVAC devices, according to various exemplary embodiments. The plurality of HVAC devices can communicate via a network such as a TCP/IP network. The network may not include any kind of central server and/or may not rely on a central server to operate. Rather, the HVAC devices can each store a copy of an HVAC data chain that includes information that can be distributed among all of the HVAC devices. The HVAC data chain can be any kind of distributed database such as a blockchain database. Rather than relying on a central server for information such as device identity information, transaction information, contract history, and control and supervisory action records, the information can be stored on all of the HVAC devices based on the HVAC data chain. Using blockchain in a building can result in high levels of reliability for the HVAC devices of the building and can provide a much more secure system than a centralized system.

The HVAC data chain can be a chain of multiple blocks. Each block can be linked to a previous block based on a hash value. The hash value of a particular block can rely on the hash of the previous block and the data inside the particular block. Since the blocks are linked in this way, any changes to a block in the chain changes that block's hash which will break the link and thus the blocks will not be properly linked. The blocks can contain information such as transaction and contract history, control action records, supervisory control action records, and other information that needs to be securely stored and/or authenticated. Each of the blocks of the HVAC data chain can include a digital signature that can be used to verify that the block is authentic, that is, the data of the block was created by the device that claims to have created the data. As more blocks are added to the HVAC data chain, it becomes exponentially more difficult to compromise the HVAC data chain. As compared to a centralized system, the difficulty to compromise the centralized system is linear or constant.

The hash values linking blocks together are generated with hash functions. Hash functions are not reversible, that is, one cannot predict the output of a hash function from a given input. A hash solution for a block is generated by repeatedly hashing an adjustable value in the block called a nonce, the hash value of a previous block in the HVAC data chain, and the data to be added to the HVAC data chain. A hash that meets a difficulty criteria is considered a solution to the block and can be added to the HVAC data chain. In some embodiments, the difficulty criteria is that the hash value is less than a predefined amount or more than a predefined amount. An HVAC device using the HVAC data chain can receive requests to add new blocks to the HVAC data chain from services, devices or other entities in the system. The HVAC device can add the block to the HVAC data chain by generating a hash solution. This method may be known as proof of work.

The unpredictable nature of the hash function can make it difficult for a device to find a random input that produces a valid hash of the block. In some cases, depending on the difficulty criterion, it can take trillions of different trials trying different nonce values until a valid hash is found. This can make it difficult to change data in a block of the HVAC data chain. By distributing the blocks on the network, the disadvantage of having a single point of failure can be eliminated and the network can become tolerant to hacking attacks at a single node of the network.

Using blockchain with HVAC devices can result in higher levels of security for a building management system (BMS) since a single point of failure is removed. If a cyber-attack is launched against the BMS, the cyber-attack would need to compromise the HVAC data chain of all the HVAC devices instead of just the data stored on a central server of the BMS. Using the HVAC data chain can result in a high byzantine fault tolerance. Further, there may be mass disintermediation due to consensus-driven decision-making associated with the HVAC data chain. Further, using the HVAC data chain may lower data corruption security breach uncertainties. Using blockchain can allow the HVAC devices to enter permanent and/or time based contracts or transactions among each other without any human intervention. In a building with HVAC devices, the HVAC devices can use blockchain to transmit access rights and licensing information, transmit control actions that can have significant impact on the controlled environment, perform transaction negotiation between two HVAC devices, transport sensitive information across the HVAC device network, and can be used for any communication in building automation and control implementations that have environment requirements that require validation and security. The HVAC data chain can be used for any communication in a BMS (e.g., transport of sensitive information) and/or other control implementation that have validated environment requirements.

Building with Distributed Edge Devices

Referring now to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
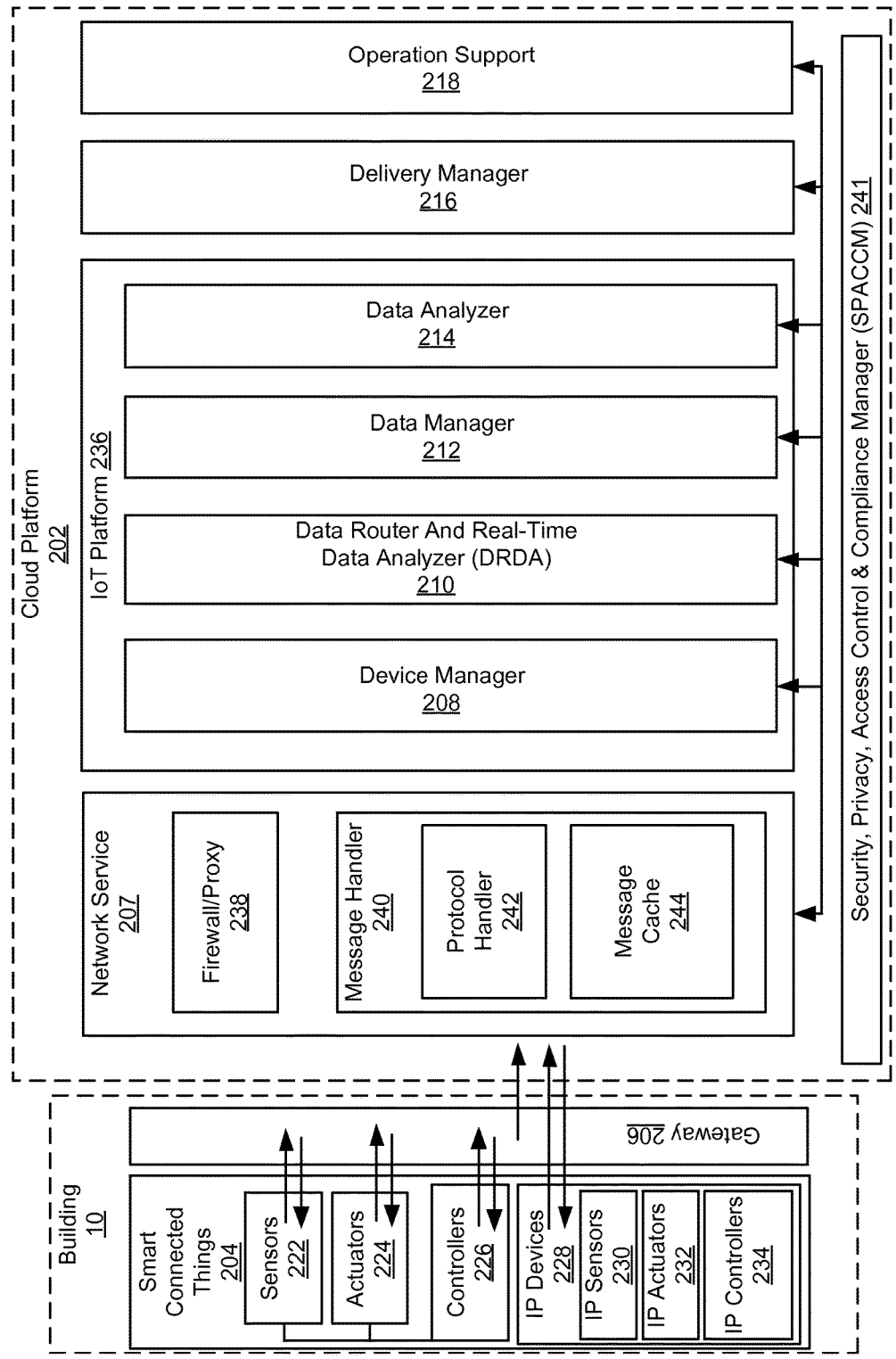
FIG. 2 is a block diagram of a system of HVAC equipment in the building of FIG. 1 communicating to a cloud platform, according to some embodiments.

Referring now to FIG. 2, system 200 is shown to include devices of building 10 coupled to a cloud platform 202, according to an exemplary embodiment. Cloud platform 202 can be one or more controllers, servers, and/or any other computing device that can be located in building 10 and/or can be located remotely and/or connected to the systems of building 10 via networks (e.g., the Internet). Cloud platform 202 can be configured to cause building 10 and the devices of building 10 to be a "self-conscious building." A self-conscious building can be a building in which building devices are interconnected via a cloud, e.g., cloud platform 202. A building of interconnected devices can be "self-conscious" in the regard that rather than having a specific controller make specific decisions for only a portion of the equipment in building 10, cloud platform 202 can receive and aggregate data from all devices of building 10 and thus make decisions for building 10 based on an aggregate set of data.

In FIG. 2, cloud platform 202 includes various services and components in some embodiments. Cloud platform 202 includes network service 207, Internet of Things IoT platform 236, delivery manager 216, and operation support 218 in some embodiments. System 200 is shown to include smart connected things 204. Smart connected things 204 includes sensors 222, actuators 224, controllers 226, and IP devices 228. Smart connected things 204 can include actuators, dampers, chillers, heaters, rooftop units (RTUs), thermostats and air handling units (AHUs), or any other type of equipment or device that can be installed within a building (e.g., fans, pumps, valves, etc.). Sensors 222 can include one or more devices that can be configured to measure various environmental conditions (e.g., light intensity, occupancy, temperature, humidity, air quality, etc.). Actuators 224 can be any device that can be configured to affect an environmental change in building 10 (e.g., maintain a setpoint in building 10, maintain an air quality level in building 10, etc.).

Controllers 226 can be any device that can be connected to sensors 222 and actuators 224. Controllers 226 can be configured to operate actuators 224 and/or collect data from sensors 222. In this regard, controllers 226 can be configured to collect data from sensors 222 and control actuators 224 based on the data received from sensors 222. Sensors 222, actuators 224, and controllers 226 may not be configured to communicate via an IP based network but can be configured to communicate with each other via a non-IP based network. In this regard, sensors 222, actuators 224, and controllers 226 may not be able to communicate directly with cloud platform 202 since the device are not Internet enabled but must communicate with cloud platform 202 via gateway 206. Cloud platform 202 can be configured to communicate via both non-IP based networks and IP based networks.

IP devices 228 can be any device in building 10 that is connected to cloud platform 202 via an IP based network. In this regard, IP devices 228 can include the hardware and/or software necessary to communicate via an IP based network. IP devices 228 can be configured to communicate directly to cloud platform 202 rather than communicating to cloud platform 202 via gateway 206. IP devices 228 are shown to include IP sensors 230, IP actuators 232, and IP controllers 234. IP sensors 230 can be similar to sensors 222. However, IP sensors 230 can communicate directly with cloud platform 202 (e.g., IP sensors 230 can communicate via an IP based network). Further, IP actuators 232 can be similar to actuators 224 and/or IP controllers 234 can be similar to controllers 226. IP actuators 232 and/or IP controllers 234 can be configured to communicate directly to cloud platform 202 via an IP based network instead of communicating to cloud platform 202 via gateway 206.

Although some embodiments in the specification are described primarily with reference to HVAC equipment, it should be understood that the systems and methods described herein can be applicable to a wide variety of building equipment and other types of connected devices (e.g., HVAC equipment, LED lights, lighting systems mobile phones, elevator systems, fire safety systems, security systems, smart street lamps, cars, televisions, etc.) with embedded intelligence and communication capabilities.

Gateway 206 can be any kind of network gateway that can be configured to aggregate and enrich data received from smart connected things 204. Gateway 206 can be used to connect the equipment of smart connected things 204 among each other in addition to connecting smart connected things 204 to cloud platform 202. In this regard, the equipment of smart connected things 204 can be legacy equipment that may not have Internet connectivity, devices that can communicate via a non-IP based network, and/or be new equipment that does have Internet connectivity, equipment that can communicate via an IP based network. Gateway 206 can get, retrieve, query, and/or receive data from smart connected things 204 and/or control smart connected things 204 based on instructions or analytics results received from cloud platform 202. Gateway 206 can provide network security, access control, and unique address of legacy devices endpoints for remote access and protocol mediation services. In some embodiments, gateway 206 is a general-purpose gateway solution made by any of a variety of hardware manufacturers (e.g., INTEL®, FREESCALE®, DELL®, TEXAS INSTRUMENTS®, etc.). In other embodiments, gateway 206 is a network connection engine (NCE) or a mobile access portal (MAP) gateway used specifically to connect building management systems and smart equipment. Gateway 206 can use various IP based protocols (e.g., Constrained Application Protocol (CoAP), Extensible Message and Presence Protocol (XMPP), Advanced Message Queuing Protocol (AMQP), Message Queue Telemetry Transport (MQTT), etc.) and web based common data exchange (e.g., Hypertext Transfer Protocol (HTTP), Representational State Transfer (RESTful), and Application Programming Interfaces (APIs)) to send data from smart connected things 204 to cloud platform 202.

Network service 207 can provide access to the Internet and/or can include and/or provide access to other types of data networks, such as a local area network (LAN), a wide area network (WAN), a cellular network, a satellite network, a radio network, or any other type of data network or combination thereof. Network service 207 is shown to include a firewall/proxy 238, protocol handlers 242, message handler 240, and message cache 244. Network service 207 can include any number of computing devices (e.g., computers, servers, routers, network switches, etc.) configured to transmit, receive, or relay data. Network service 207 can further include any number of hardwired and/or wireless connections.

Network service 207 can include services that facilitate managing fixed or wireless communication with smart connected HVAC things 204. Network vendors can include, for example, cellular telecommunications providers (e.g., VERIZON®, T-MOBILE®, AT&T®, etc.) as well as Internet service providers. Communications via network service 207 can leverage enterprise contracts and partnerships to optimize the cost of data transmission. Many network carriers provide a secure connection option as a part of premium services. However, a similar degree of network securities can be achieved via employing trust platform chip in smart connected smart connected things 204 and using encrypted messaging such as AMQP via an IP based secure transport.

Firewall/proxy 238 can be any firewall and/or proxy which protects smart connect things 204 from hacking, spyware, malware, or other threats or computer viruses. In this regard, firewall/proxy 238 can allow smart connected things 204 to be connected to cloud platform 202 and/or the Internet while minimizing the risk that smart connected things 204 can be hacked and/or otherwise used by unauthorized persons who can attempt to access smart connected things 204 via the Internet or any other network. Message handler 240 can be configured to facilitate communicate between smart connected things 204 and cloud platform 202. For example, message handler 240 can be configured to send and/or receive data directly from IP devices 228 (e.g., IP sensors 230, IP actuators 232, and/or IP controllers 234). Further, message handler 240 can be configured to send and receive data indirectly from sensors 222, actuators 224, and/or controllers 226 via gateway 206.

Message handler 240 is shown to include protocol handler 242 and message cache 244. In some embodiments, protocol handler 242 can be configured to decode and/or otherwise process the data received from smart connected things 204 based on the network protocol used to transmit the data to cloud platform 202. Further, protocol handler 242 can send messages to smart connected tings 204 based on a particular network protocol. Message cache 244 can be any type of data cache (e.g., hardware and/or software component) that accounts for redundancies in messaging. For example, message cache 244 can be any type of network cache which stores data that is commonly accessed by and/or frequently sent to smart connected things 204. By storing the highly requested and/or highly transmitted data locally in message cache 244, the highly requested data does not need to be repeatedly requested from other various components of cloud platform 202.

System 200 is shown to include, security, privacy, access control, and compliance manager (SPACCM) 241. Security can be provided at both the device (e.g., smart connected things 204) and network levels (e.g., cloud platform 202). The same intelligence that enables devices to perform their tasks can also enable them to recognize and counteract threats. At any given point in time, IoT platform 236 can support multiple users and stake holders including building owners, building operators, tenants, service technicians, manufacturers, and the like. Cloud platform 202 can allow remote accessibility of smart connected things 204 (e.g., via the Internet). For this reason, remote accessibility of connected products can involve complex identity management through a unified login and product management experience that can be facilitated by SPACCM 241. For example, a single login can allow a customer to sign on to all connected products and services associated with IoT platform 236.

Still referring to FIG. 2, cloud platform 202 is shown to include IoT platform 236. IoT platform 236 is shown to include device manager 208, data router and real-time data analyzer 210, data manager 212, and data analyzer 214. IoT platform 236 can include various large IoT solution providers such as MICROSOFT®, INTEL®, CISCO®, GOOGLE®, AMAZON®, SAP®, QUALCOMM®, and/or ORACLE® that offer general-purpose solutions with developer tools for customization in addition to AXEDA®, ETHERIOS®, THINGWORX®, and GENERAL ELECTRIC® (GE®) that offer integrated industry solutions. In some embodiments, IoT platform 236 leverages the industry's first on-premises, off-premises hybrid architecture, MICROSOFT AZURE®.

Device manager 208 can be configured to identify smart connected things 204. In some embodiments, device manager 208 identifies smart connected things 204 via a token sent by smart connected things 204 and/or via any other login credential. For example, the token can be an encrypted key that device manager 208 can decrypt. Based on the identity of a device of smart connected things 204, device manager 208 can allow the device to retrieve data and/or software stored by IoT platform 236. Device manager 208 can be further configured to generate control signals for smart connected things 204 and/or otherwise control the functionality of smart connected things 204.

Data router and real-time data analyzer (DRDA) 210 can be configured to route data in cloud platform 202 and/or to building 10 in addition to performing real-time data analytics. DRDA 210 can be configured to route messages received from smart connected things 204 to various components of cloud platform 202, devices of building 10, and/or other devices connected to the Internet. Further, DRDA 210 can be configured to perform complex event processing. DRDA 210 can be configured to infer (derive) events and/or event patterns based on data received from various data streams. The data streams can be data streams received from building 10, data streams received from cloud platform 202, data streams received from the Internet, and/or any other received data and/or data stream. Complex event processing can identify various events quickly (e.g., in real time). The events can be security threats, emergencies for building 10, and/or other events which cloud platform 202 needs to respond to quickly. For this reason, DRDA 210 can be configured to respond to any event which it determines needs a quick and/or immediate response.

Data manager 212 can include one or more databases, memory storage units, and/or any other hardware and software component that can store and/or manage information. Data manger 212 can include file systems such as Hadoop Distributed File System (HDFS), various databases such as key-value storage, relational database management systems (RDBMS), graph databases, various mapping structures and/or any other system for storing data. In various embodiments, data manager 212 can be configured to manage, organize, integrate, and store data, and/or send data to various components of cloud platform 202. For example, data manager 212 can generate various reports and/combine (e.g., integrate) data from disparate devices in building 10, various components of cloud platform 202, and/or the Internet.

Data analyzer 214 can be configured to perform data processing on data received from smart connected things 204, various components of cloud platform 202, and the Internet. Data analyzer 214 can be configured to perform parallel data analytics on received data and in some embodiments and/or use a software framework such Hadoop to perform the data processing. Data analyzer 214 can be configured to generate business intelligence metrics. Business intelligence metrics can be generated based on the received data. In some embodiments, the business intelligence metrics indicate power consumption of a building, predicted operating costs of new equipment, equipment replacements, and/or any other intelligence metric that can be generated from the received data. Further, data analyzer 214 can be configured to perform data mining to determine various patterns in large data sets that data analyzer 214 can receive and/or collect. Further, data analyzer 214 can be configured to perform any kind of time series data analysis (e.g., data cleansing, data extrapolation, interpolation, averaging). Time series data analysis can be temperatures of a zone collected by a sensors of building 10 e.g., sensors 22. For example, data analyzer 214 can "cleanse" the time series data by compressing the data points based on an upper threshold and/or a lower threshold.

Cloud platform 202 includes delivery manager 216 in some embodiments. Delivery manager 216 is related to channel and distribution strategy and can include a product distributor. A product distributor can include off-line distribution of IoT related products, services and on-line distribution of solutions for a certain customer and/or a market. Delivery manager 216 can include various APIs that enable application developers to deliver information products. Delivery manager 216 can include data visualization, exploration tools, and/or any other method for rapidly delivering data related to building 10 to an end user. In some embodiments, delivery manager 216 is integrated with various enterprise applications e.g., applications owned and/or operated by GOOGLE®, MICROSOFT®, and/or any other entity.

Operation support 218 can facilitate the integration and optimization of devices, systems, and components to unite interrelated applications. Operation support 218 can include various financial and/or customer services. For example, operation support 218 can include various applications for customer relationship management (CRM), enterprise resource planning (ERP), customer billing, reporting information regarding building 10 and/or any other business related application. For example, operation support 218 can facilitate providing data from IoT platform 236 to outside businesses (e.g., insurance companies, utility providers, governmental agencies, etc.) that can have an interest in such data.

Figure 3:
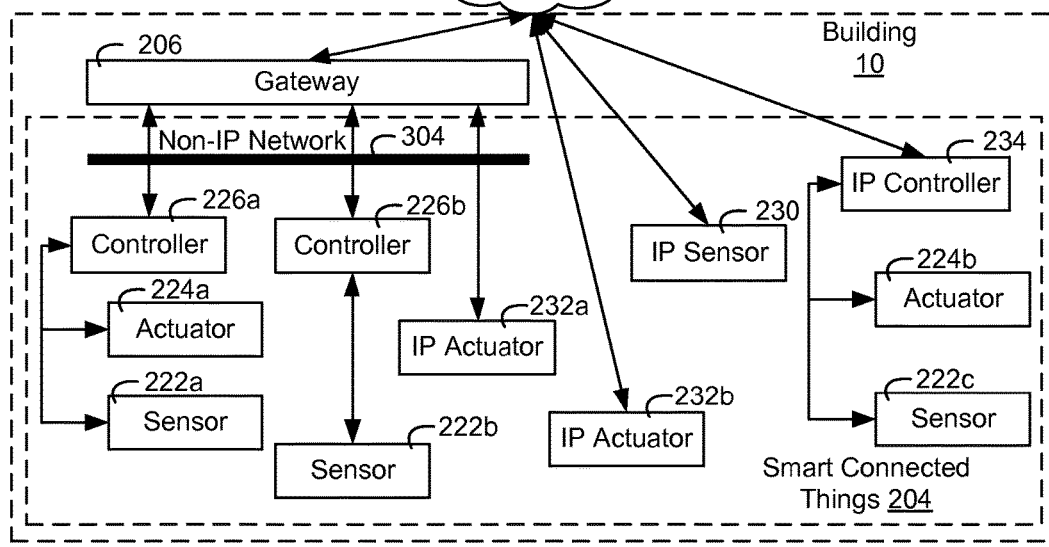
FIG. 3 is a system block diagram of the HVAC equipment in the building of FIGS. 1-2 in greater detail, according to some embodiments.

Referring now to FIG. 3, smart connected things 204 and building 10 as described with reference to FIGS. 1-2 is shown in greater detail, according to an exemplary embodiment. In FIG. 3, cloud platform 202 as described with further reference to FIG. 2 is shown to be connected to IP network 302. IP network 302 can be any IP network and/or communication protocol. For example, IP network 302 can be and/or include TCP/IP, Ethernet, Wi-Fi, Zigbee IP, a building WAN, etc. Gateway 206, as described with further reference to FIG. 2, is shown to communicate with both IP network 302 and non-IP network 304. Non-IP network 304 can include networks and/or protocols that are not IP based. For example, non-IP network 304 can be and/or include Zigbee, BACnet, controller area network (CAN) protocol, Modbus, and/or any other non-IP based network and/or protocol.

In FIG. 3, controller 226a and 226b are shown to communicate to cloud platform 202 via gateway 206. Controller 226a and 226b can be similar to and/or the same as controllers 226 as described with further reference to FIG. 2. Actuator 224a, sensor 222a, and sensor 222b can be connected to cloud platform 202 via controller 226a and controller 226b respectively. Actuator 224a, sensor 222a, and sensor 222b can be the same and/or similar to actuators 224 and/or sensors 222 as described with further reference to FIG. 2. IP actuator 232a can be connected to cloud platform 202 via gateway 206 even though IP actuator 232a can be able to communicate directly with IP network 302. IP actuator 232a can be the same and/or similar to IP actuator 232 as described with further reference to FIG. 2.

IP sensor 230, IP actuator 232b, and IP controller 234 are shown to communicate directly with cloud platform 202 via IP network 302. IP sensor 230 and IP controller 234 are described with further reference to FIG. 2 while IP actuator 232b can be the same and/or similar to IP actuator 232 as described with reference to FIG. 2. As shown, IP sensor 230, IP actuator 232b, and IP controller 234 communicate to cloud platform 202 without first communicating to gateway 206. IP controller 234 is shown to communicate with actuator 224b and sensor 222c both of which may not be configured to communicate with IP network 302. Actuator 224b and sensor 222c can be the same and/or similar to actuators 224 and sensors 222 as described with further reference to FIG. 2. IP controller 234 can effectively act as a gateway for actuator 224b and sensor 222c and connect both devices to cloud platform 202.

Even though some devices of building 10 must communicate to cloud platform 202 via gateway 206 while other devices can communicate directly with cloud platform 202, the data of all of the devices of building 10 can be "joined together" via cloud platform 202 and/or utilized by cloud platform 202 as an aggregate data set in some embodiments. The devices are "joined together" in the sense that cloud platform 202 can make decisions for all of the devices of building 10 based on all of the data retrieved from all of the devices of building 10. In this regard, building 10 can be understood to be a "self-conscious" building, a building in which decisions are made based on a complete set of data of all building devices.

Figure 4:
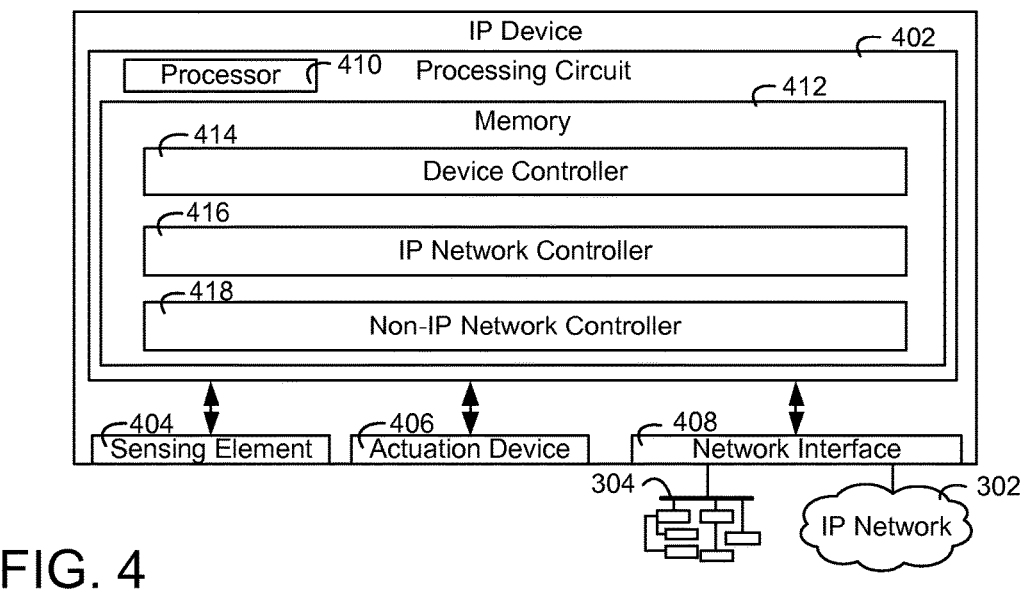
FIG. 4 is a block diagram of an internet enabled HVAC device of the building of FIGS. 1-3 in greater detail, according to some embodiments.

Referring now to FIG. 4, an IP device 400 is shown, according to an exemplary embodiment. IP device 400 can be any one of IP devices 228 as described with further reference to FIG. 2. IP device 400 is shown to include a network interface 408. Network interface 408 can be a hardware interface which allows IP device 400 to communicate with both non-IP network 304 and IP network 302. IP device 400 is shown to include sensing element 404 and actuation device 406. Sensing element 404 can be one or more hardware components configured to measure temperature, pressure, humidity, pressure, air quality, and/or any other environmental and/or non-environmental condition. Actuation device 406 can be any device that IP device 400 can control to affect an environmental change in building 10. For example, actuator device 406 can be an electric motor that IP device 400 can use to control a valve.

IP device 400 includes a processing circuit 402 that includes processor 410 and memory 412. In this regard, information stored on memory 412 can be executed on processor 410. Memory 412 is shown to include device controller 414. In some embodiments, device controller 414 can send data collected from sensing element 404 to cloud platform 202 via IP network 302. In various embodiments, device controller 414 receives control commands from cloud platform 202 for actuation device 406. In this regard, device controller 414 can be configured to control actuator device 406 based on the commands received from cloud platform 202.

Device controller 414 can be configured to send control commands to various devices connected to IP device 400, receive data from the various devices, receive data from sensing element 404, and/or send commands to actuation device 406. For example, if IP device 400 is IP controller 234 as described with references to FIG. 3, device controller 414 can be configured to control actuator 224b and/or sensor 222c. In this regard, device controller 414 can send data to cloud platform 202 that device controller 414 receives from actuator 224b and/or sensor 222c. Further, device controller 414 can be configured to send control commands to actuator 224b and/or 222c based on messages and/or data device controller 414 can receive from IP network 302.

IP network controller 416 can be configured to facilitate communicate with IP network 302. In some embodiments, IP network controller 416 includes instructions for various Internet communication protocols (e.g., Transmission Control Protocol/Internet Protocol (TCP/IP), Internet Protocol Version 4 (IPv4), Internet Protocol Version 6 (IPv6), etc.). Non-IP network controller 418 can be configured to facilitate communication with non-IP network 304 and/or any other non-IP based network or communication protocol for communicating with other devices in building 10.

Distributed HVAC Blockchain Database Systems and Methods

Figure 5:
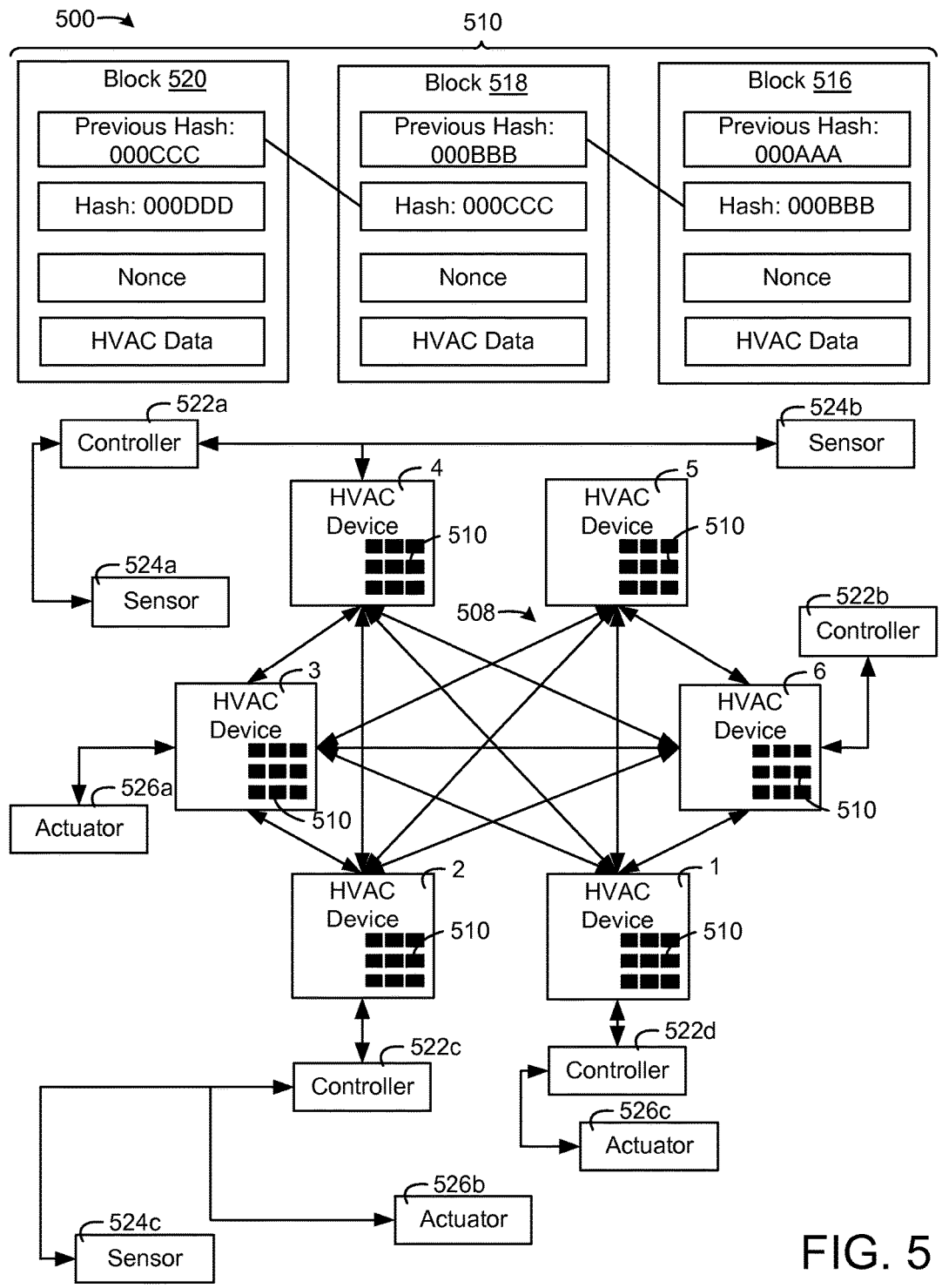
FIG. 5 is a block diagram of a system of HVAC devices communicating via a network, the HVAC devices including an HVAC data chain, according to some embodiments.

Referring now to FIG. 5, a system 500 of HVAC devices communicating via a network, with the HVAC devices storing an HVAC data chain 510, is shown, according to a some embodiments. System 500 is shown to include a number of HVAC devices communicating via a network 508. The number of HVAC devices are shown to include HVAC device 1, HVAC device 2, HVAC device 3, HVAC device 4, HVAC device 5, and HVAC device 6. There can be any number of HVAC devices in system 500. HVAC devices 1-6 can be any controller, actuator, or sensor that can communicate via network 508. In some embodiments, HVAC devices 1-6 are building gateways, Network Automation Engines (NAEs), Network Integration Engines (NIEs), Field Equipment Controllers (FECs), and/or various other building devices or building controllers. HVAC devices 1-6 can be the devices of smart connected things 204 and/or gateway 206 as described with reference to FIGS. 2-3. In some embodiments, HVAC devices 1-6 are VAV units 116, AHU 106, chiller 102, and/or boiler 104 as described with reference to FIG. 1.

In some embodiments, HVAC devices 1-6 can be computing devices that utilize Software Agents. Software Agents are described with further reference to U.S. patent application Ser. No. 15/367,167 filed Dec. 1, 2016, the entirety of which is incorporated by reference herein.

In some embodiments, HVAC devices 1-6 are located in a single building, multiple buildings, multiple cities, and/or multiple countries. In some embodiments, some and/or all of HVAC devices 1-6 are located in building 10 as described with reference to FIG. 1. HVAC devices 1-6 can be configured to communicate with each other via network 508. Network 508 can be any kind of network such as the Internet, TCP/IP, Ethernet, LAN, WAN, Wi-Fi, Zigbee, BACnet, 3G, LTE, Li-Fi, and/or any combination thereof. HVAC devices 1-6 can communicate via network 508 with various messaging protocols such as Message Queue Telemetry Transport (MQTT), Advanced Message Queuing Protocol (AMQP), ZeroMQ, and can support various publication/subscription and/or push/pull operations.

In some embodiments, some and/or all of HVAC devices 1-6 can be located in a particular building and/or building zone. In some embodiments, each of HVAC devices 1-6 and the devices connected to them are located in a particular zone of building 10. In various embodiments, some and/or all of HVAC devices 1-6 are configured to control the environmental conditions of a particular building and/or building zone. HVAC devices 1-6 are shown to be connected to various sensors, actuators, and controllers. HVAC device 1 is shown to be connected to controller 522d and actuator 526c via controller 522d. HVAC device 2 is shown to be connected to controller 522c and actuator 526b and sensor 524c via controller 522c. HVAC device 3 is shown to be connected to actuator 526a. HVAC device 4 is shown to be connected to controller 522a, sensor 524a, and sensor 524b. HVAC device 6 is shown to be connected to controller 522b. Controller 522a-d can be the same as or similar to controllers 226 or IP controller 234 as described with further reference to FIG. 2 and/or controllers 226a-b as described with further reference to FIG. 3. Similarly, sensors 524a-c can be the same and/or similar to sensors 222 and/or IP sensors 230 as described with reference to FIG. 2 and/or sensors 222a-c as described with reference to FIG. 3. Further, actuators 526a-c can be similar to and/or the same as actuators 224 and/or IP actuators 232 as described with reference to FIG. 2 and/or actuators 224a-b as described with reference to FIG. 3.

HVAC devices 1-6 can monitor energy consumption, control lighting systems, control HVAC systems, or perform other functions within the BMS. HVAC devices 1-6 can be configured to optimize optimizing the systems they control based on energy efficiency, occupants comfort and productivity, and corporate or regulatory policies. HVAC devices 1-6 may be various HVAC devices, building lighting devices, building security devices (e.g., cameras, access control, etc.), safety devices (e.g., devices of a fire system), and/or devices of any other system of a building (e.g., building 10). In some embodiments, using temperature information from a room and/or zone as well as temperature data from an outside monitor, HVAC devices 1-6 can be configured to affect environmental changes in the room and/or zone. In some embodiments, HVAC devices 1-6 can cause dampers (e.g., actuators 526*a-c*) located in an air duct to be opened or closed, can activate heating, cooling, and/or air circulation equipment in the building and/or zone, and/or can perform any other control command that causes a room, zone, and/or building to be controlled to a particular temperature.

The building that HVAC devices 1-6 are located in may be building 10. Building 10 may include multiple zones and thus, each of HVAC devices 1-6 may be located in a different zone. A zone in building 10 may be a set of rooms and may include equipment installed and/or associated with that particular zone. A zone may be any size and/or may include any number of rooms. There may be devices in a zone connected via a communication bus (e.g., BACnet, Modbus and master slave token passing). Each of the HVAC devices 1-6 may be connected to the communication bus in each and/or some of the zones of the building in addition to network 508. Thus, HVAC devices 1-6 can communicate with other high level controllers (e.g., HVAC devices 1-6) and/or low level devices (e.g., sensors and/or actuators).

HVAC devices 1-6 are shown to each include HVAC data chain 510. HVAC data chain 510 can be a chain of one or more data blocks where each data block is linked to a previous block, thus, forming a chain. The chain may be a chain of sequentially ordered blocks. In some embodiments, HVAC data chain 510 is a blockchain database. HVAC devices 1-6 can exchange building data that they collect via controllers 522*a-d*, sensors 524*a-c*, and/or actuators 526*a-c* via HVAC data chain 510. In some embodiments, HVAC data chain 510 includes information regarding software licenses for HVAC devices 1-6, access to data for HVAC devices 1-6, and various other building related information. HVAC data chain 510 can be the same on each of HVAC devices 1-6. This allows each device of system 500 to have access to the same information. Further, this allows each of HVAC devices 1-6 to communicate with each other directly rather than relying on a central computing system.

HVAC data chain 510 can include any number of blocks and new blocks can be added to HVAC data chain 510. Three blocks of HVAC data chain 510 are shown in FIG. 5, block 516, block 518, and block 520. Each block is shown to include a nonce, HVAC data, a hash, and a hash of the previous block in the chain. HVAC data chain 510 is illustrated right to left, that is, the rightmost block is the oldest block shown in FIG. 5 while the leftmost block is the newest block shown in FIG. 5. The HVAC data of each block can be contracts, transactions, data, licenses, access control and/or any other information. In this regard, HVAC devices 1-6 can negotiate contracts among each other, as well as grant and/or deny access to information for one or more of HVAC devices 1-6. HVAC data chain 510 can include configuration data of HVAC devices 1-6, and/or any other information. Since HVAC data chain 510 may be public, if one of HVAC devices 1-6 goes offline, any of the other devices can retrieve information for the offline HVAC device from HVAC data chain 510 and take over the responsibilities of the offline HVAC device since any information needed to take over may be public in HVAC data chain 510. In some embodiments, HVAC devices 1-6 can retrieve the information from each other rather than HVAC data chain 510.

Blocks 516-520 are shown to include a nonce value. The nonce value can be a value that when hashed with the HVAC data of the block and the previous hash, in addition to other information, results in a hash that meets a difficulty requirement. In FIG. 5, the difficulty requirement is that the first three values of each hash are zeros. If the hash is considered as a hexadecimal number, the difficulty requirement can be understood as a value that a valid hash must be less than. Any of the HVAC devices 1-6 can attempt to generate a block with a hash value that meets the difficulty requirement. In some embodiments, some and/or all of HVAC devices 1-6 work on generating a hash value for a new block to be added to HVAC data chain 510. If one of the HVAC devices 1-6 generate a hash that meets the difficulty requirement, that HVAC device can add the block to HVAC data chain 510 and notify the other devices of HVAC device 4 of the solved block so that the other HVAC devices can also add the solved block to the HVAC data chain 510 that they store.

In some embodiments, the blocks of HVAC data chain 510 make up a record of data for a building and/or for various devices. For example, the blocks of HVAC data chain 510 may each comprise HVAC data associated with the building. Each block may store HVAC data of a particular device of HVAC devices 1-6. Together, in HVAC data chain 510, the blocks may make up a record of all the HVAC data associated with the building. In another example, the blocks each include information pertaining to licensing information for HVAC devices 1-6. On their own, the blocks may only indicate the licensing information for one of HVAC devices 1-6. However, together, in HVAC data chain 510, the blocks may represent a record of all licensing for a particular building and/or for HVAC devices 1-6. In yet another example, the blocks of HVAC data chain 510 may each individually include information pertaining to a particular zone of a building. HVAC devices 1-6 can be configured to generate and/or retrieve the data and adding them to a block of HVAC data chain 1-6. Individually, the blocks of HVAC data chain 510 may represent HVAC data for only particular zones, however, together, in HVAC data chain 510, the blocks may represent HAVC data for a plurality of zones and/or for a particular building that includes the plurality of zones. This concept of storing a complete record of information in pieces in blocks of HVAC data chain 510 can be used to store any kind of data described herein.

In some embodiments, if HVAC data chain 510 indicates that HVAC device 1 is licensed to run software A, HVAC device 1 can retrieve software A from any of HVAC devices 1-6 since each of HVAC devices 1-6 can verify, via HVAC data chain 510, that HVAC device 1 is licensed to have software A. In some embodiments, HVAC data chain 510 can indicate that HVAC device 1 has access to the HVAC data of HVAC device 2. In this regard, any of HVAC devices 1-6 can send building data of HVAC device 2 to HVAC device 1 in response to receiving a request from HVAC device 1 for the building data of HVAC device 2, since each of HVAC devices 1-6 can verify that HVAC device 1 has access to the device data of HVAC device 2 via HVAC data chain 510.

Each block of data chain 510 can include a signature. This signature can be used by each of HVAC devices 1-6 to verify that the data published in HVAC data chain 510 has been published by one of HVAC devices 1-6. This signature can be a digital signature such as an RSA signature or other signature type as described elsewhere herein. Using a digital signature can stop a device from "imitating" another device and allows of HVAC devices 1-6 to confirm the authenticity of a particular block in HVAC device chain 510.

Figure 6:
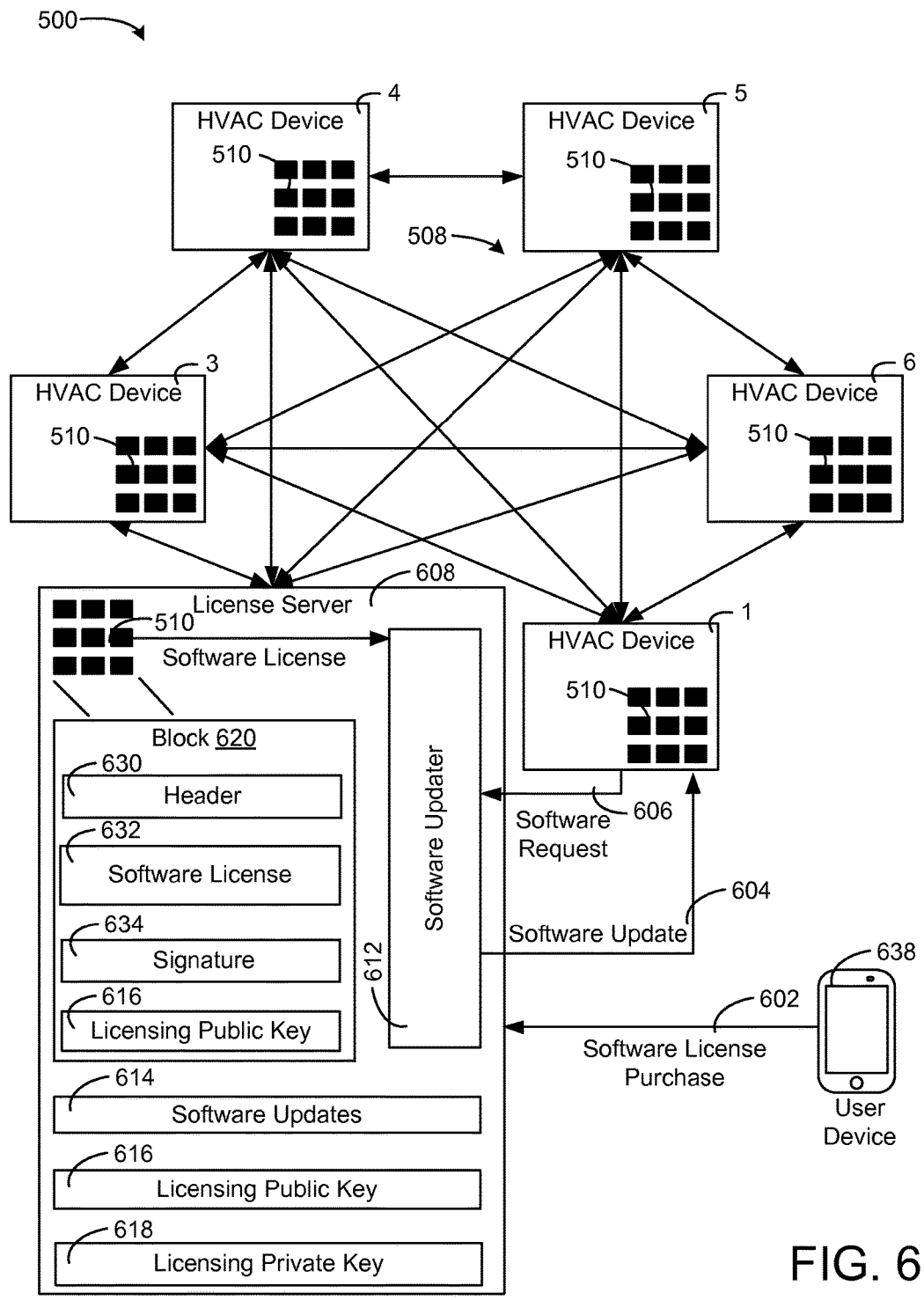
FIG. 6 is a block diagram of the system of FIG. 5 shown to include a license server including the HVAC data chain of FIG. 5, according to an exemplary embodiment.

Referring now to FIG. 6, another embodiment of system 500 is shown including a license server 608, according to an some embodiments. License server 608 can be any computing device and can be the same and/or similar to HVAC devices 1-6. In various embodiments, license server 608 includes a processing circuit with a processor and a memory device, the processing circuit being configured to perform some and/or all of the functionality of license server 608. The processing circuit, the processor, and the memory of license server 608 can be the same and/or similar to processing circuit 914, processor 916, and memory 918 as described with further reference to FIG. 9. License server 608 can be similar to and/or the same as cloud platform 202 as described with further reference to FIG. 2.

In FIG. 6, system 500 is shown to include user device 638. User device 638 can be any laptop computer, desktop computer, smart phone, tablet, and/or any other computing device that a user can use to purchase a software license. Software may be purchased via the user device 638 via websites hosted and/or in communication with license server 608. In this regard, user device 638 may communicate with license server 608 via the Internet (e.g., network 508). License server 608 is shown to receive software license purchase 602 from user device 638. Software license purchase 602 can be a message indicating that a user wants to and/or has purchased a particular software license for a particular piece of software for a particular HVAC device, such as HVAC device 1.

License server 608 is shown to include software updater 612 which can be configured to communicate with HVAC devices 1 and 3-6 in addition to user device 638. Software updater 612 can be configured to receive software requests and send software updates to licensed devices. Further, software updater 612 can facilitate license purchases with user device 638. In some embodiments, software updater 612 can generate a block for HVAC data chain 510 that includes software licensing information.

In response to receiving software license purchase 602, license server 608 can be configured to generate block 620 that includes a software license for HVAC Device 1. Block 620 can include a block header 630, a software license 632 for HVAC device 1, a signature 634, and a licensing public key 636. License server 608 is shown to include licensing public key 616 and licensing private key 618. Licensing server 608 can generate licensing public key 616 and/or licensing private key 618. Licensing public key 616 and/or licensing private key 618 can be a Rivest, Shamir, and Adelman (RSA) key pair in addition to any other key pair type for digitally signing data, some of which are referred to herein. The signature 634 can be used to verify, by HVAC devices 1 and 3-6, that software license 632 is authentic, that is, it has been generated by an authorized entity, license server 608.

License server 608 can send block 620 to other devices in system 500, HVAC devices 1 and 3-6, so that HVAC devices 1 and 3-6 can determine a solution for block 620 and add the block to HVAC data chain 510. In some embodiments, HVAC devices 1 and 3-6 can use signature 634, licensing public key 616, and software license 632 to verify that block 620 originated from license server 608.

HVAC device 1 can be configured to determine that HVAC device 1 is licensed for a particular piece of software based on HVAC data chain 510. HVAC device 1 can verify that block 620 includes a signature 634 for license server 608. Further, HVAC device 1 can be configured to determine that HVAC device is licensed for a particular piece of software based on software license 632.

In response to determining, based on HVAC data chain 510, that HVAC device 1 is licensed for a particular piece of software, HVAC device 1 can send software request 606 to license server 608. Software request 606 can be a request for the software licensed to HVAC device 1 in block 620, shown as software license 632 in FIG. 6. License server 608 can be configured to determine, based on HVAC data chain 510 that HVAC device 1 is licensed for the software being requested in software request 606. In response to determining that HVAC device 1 is licensed for the requested software, license server 608 can be configured to send HVAC device 1 software update 604. Software update 604 can be a particular piece of software that license server 608 stores in a software data repository, software updates 614, and that software license 632 indicates that HVAC device 1 is licensed for.

Figure 7:
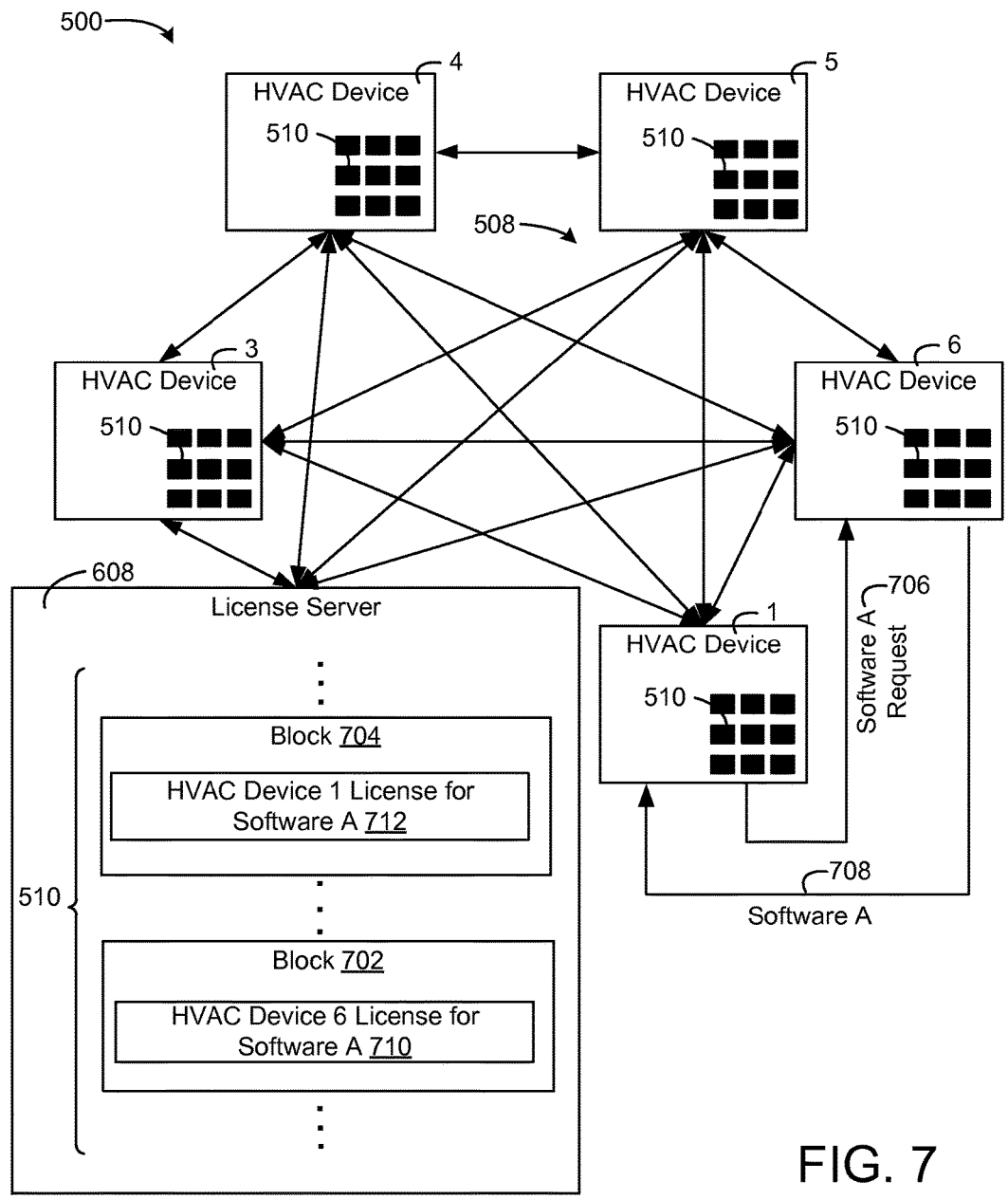
FIG. 7, is a block diagram of the system of FIG. 5 illustrating one HVAC device retrieving a software update from another HVAC device based on the HVAC data chain of FIG. 5, according to some embodiments.

Referring now to FIG. 7, another embodiment of system 500 is shown for retrieving a software update for one HVAC device from another HVAC device, according to an exemplary embodiment. In FIG. 7, HVAC device 1 can be configured to send software A request 706 to HVAC device 6. HVAC device 6 is shown to be configured to reply to software A request 706 by sending software A 708 to HVAC device 1.

Based on HVAC data chain 510, HVAC device 1 can be configured to determine that HVAC device 1 and HVAC device 6 are both licensed for software A. HVAC data chain 510 is shown to include block 704 and block 702. Block 702 is shown to include a license 710 that HVAC device 6 is licensed for software A. Block 704 is shown to include a license 712 that HVAC device 1 is licensed for software A. Based on licenses 710 and 712 of blocks 702 and 704 of HVAC data chain 510, HVAC device 1 can be configured to determine that itself is licensed for software A. Based on block 702, HVAC device 1 can be configured to determine that HVAC device 6 is licensed for software A and that HVAC device 3 may possibly have software A. Blocks 704 and/or 702 may be digitally signed by license server via licensing public key 616. HVAC device 1 and/or 6 can determine that the licenses 712 and/or 710 are authentic based on the signature and public key 616.

In response to determining that HVAC device 1 is licensed for software A and that HVAC device 6 is licensed for software A, HVAC device 1 can be configured to send software A request 706 to HVAC device 6. HVAC device 6, in response to receiving software A request 706, can be configured to use HVAC data chain 510 to determine that HVAC device 1 is licensed for software A. In some embodiments, HVAC device 6 determines, based on license 712 of block 704 of HVAC data chain 510, that HVAC device 1 is licensed for software A. In response to determining that HVAC device 1 is licensed for software A based on HVAC data chain 510 and/or in response to receiving software A request 706 from HVAC device 1, HVAC device 6 can be configured to send software A 708 to HVAC device 1.

Figure 8:
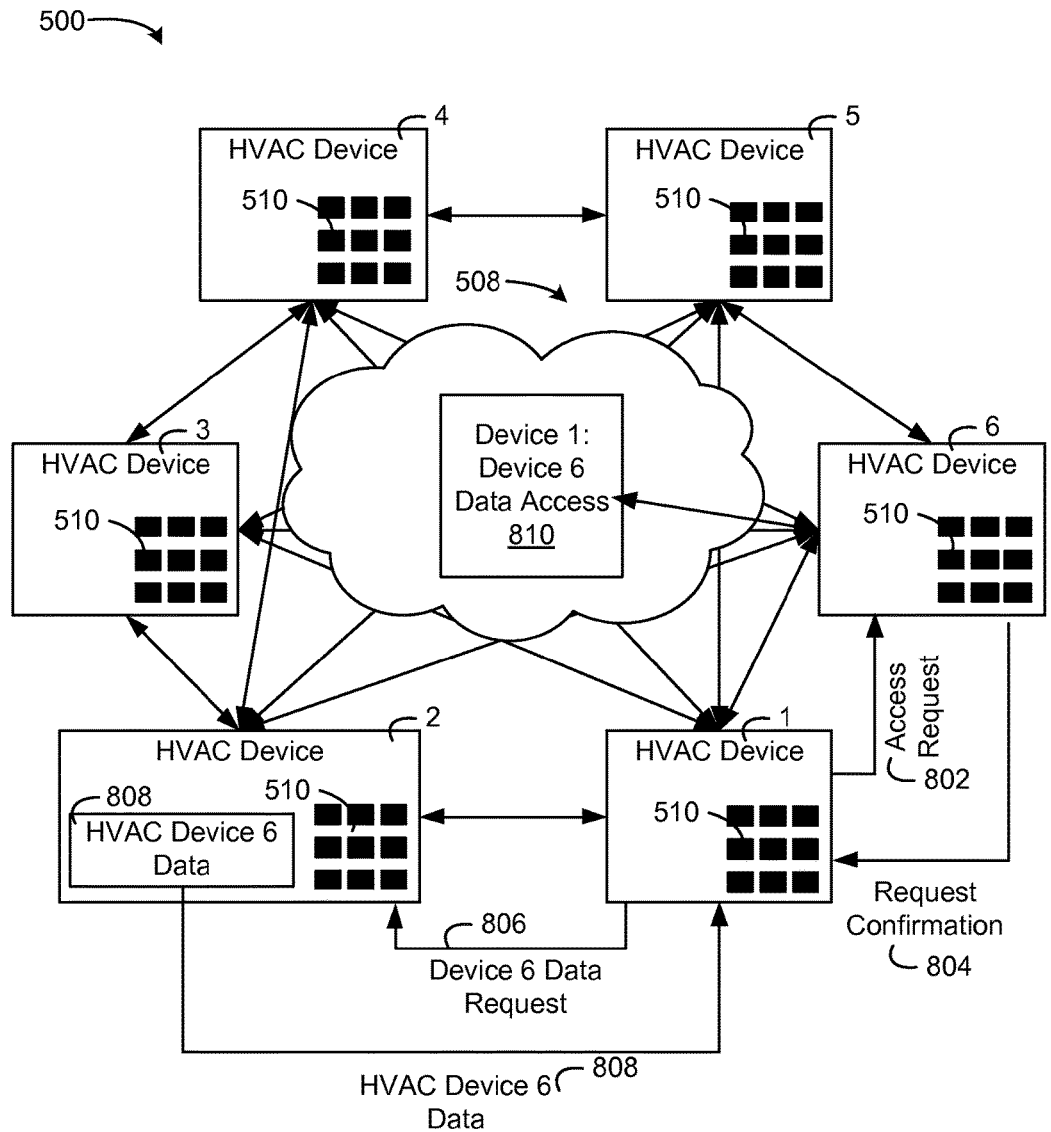
FIG. 8, is a block diagram of the system of FIG. 5 illustrating devices coordinating data access between the devices based on the HVAC data chain of FIG. 5, according to some embodiments.

Referring now to FIG. 8, system 500 is shown in which two devices coordinate data access between the two devices, according to an exemplary embodiment. In FIG. 8, HVAC device 1 is shown to be configured to send an access request 802 to HVAC device 6. Access request 802 can be a request for specific HVAC data of HVAC device 6, such as HVAC device 6 data 808. In some embodiments, HVAC device 6 data 808 can be data for a particular zone such as zone temperature, zone humidity, zone air quality, etc. In some embodiments, HVAC device 6 collects HVAC device 6 data via various sensors, actuators, and/or controllers.

In response to receiving access request 802, HVAC device 6 can be configured to send request confirmation 804 to HVAC device 1. Request confirmation 804 can indicate that request confirmation 804 accepted or denied. In response to determining that HVAC device 1 should be authorized to receive HVAC device 6 data, HVAC device 6 can generate a new block, block 810, for HVAC data chain 510. HVAC device 6 can send block 810 to HVAC devices 1-5 so that block 810 can be solved and added to HVAC data chain 510. Block 810 can indicate that HVAC device 6 has given HVAC device 1 access to HVAC data of HVAC device 6.

HVAC device 1 can be configured to determine, based on HVAC data chain 510, that HVAC device 2 is authorized to receive HVAC data of HVAC device 6, HVAC device 6 data 808. This can indicate that HVAC device 2 may have the data which HVAC device 1 wants. In response to determining that HVAC device 2 is authorized to receive HVAC device 6 data 808, HVAC device 1 can be configured to send a request to HVAC device 2 for HVAC device 6 data.

In FIG. 8, HVAC device 1 is shown to send device 6 data request 806 message to HVAC device 2 for HVAC device 6 data 808. HVAC device 1 can determine that HVAC device 2 has HVAC device 6 data 808 by sending a message to HVAC device 2. HVAC device 2 can reply to this message. In some embodiments, HVAC device 2 replies to the message by determining that HVAC device 2 has access to HVAC device 6 data 808 based on HVAC data chain 510. HVAC device 2 can receive device 6 data request 806 from HVAC device 1. Based on HVAC data chain 510, HVAC device 2 can determine that HVAC device 1 is authorized to receive HVAC device 6 data 808. In response to determining that HVAC device 1 is authorized to receive HVAC device 6 data 808, HVAC device 2 can send HVAC device 6 data 808 to HVAC device 1.

In other examples, rather, than using HVAC data chain 510 to determine that HVAC device 2 is also licensed for HVAC device 6 data 808, HVAC device 1 can send device 6 data request 806 to HVAC device 6 and receive HVAC device 6 data 808 from HVAC device 6.

Figure 9:
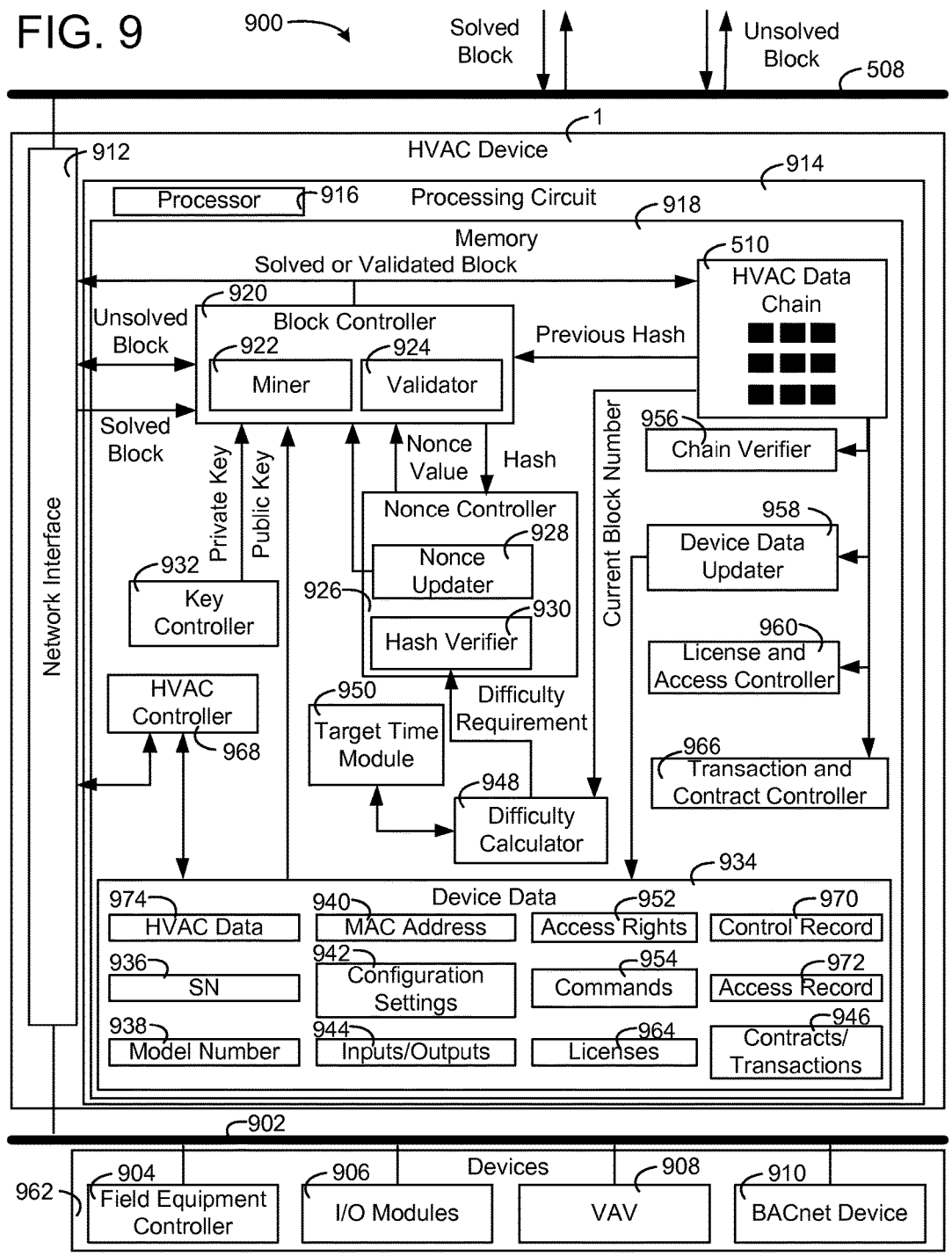
FIG. 9 is a block diagram of one of the HVAC devices of FIG. 5 shown in greater detail, according to some embodiments.

Referring now to FIG. 9, a block diagram illustrating system 900 showing HVAC device 1 in greater detail is shown, according to some embodiments. In system 900, HVAC device 1 is shown to communicate via network 508 as described with further reference to FIG. 5. In this regard, HVAC device 1 can communicate with HVAC devices 2-6 as described with further reference to FIG. 5. HVAC device 1 can send a block to be added to HVAC data chain 510 to HVAC devices 2-6 via network 508. Further, HVAC device 1 can be configured to receive a solved block from network 508. A solved block can be a block that includes a solution that one of HVAC devices 2-6 have determined.

HVAC device 1 is shown to communicate via network 902. Network 902 can be a Zigbee, BACnet, controller area network (CAN) protocol, Modbus, and/or any type of field bus. In some embodiments, network 902 is similar to and/or the same as non-IP network 304, IP network 302, and/or network 508. HVAC device 1 is shown to communicate with devices 962. Devices 962 may include field equipment controller 904, I/O modules 906, VAV 908, and BACnet device 910 via network 902. Devices 962 can be any device that can affect an environmental change in a building. Devices 962 can include VAV units 116, AHU 106, chiller 102, and/or boiler 104 as described with reference to FIG. 1. HVAC device 1 can be configured to receive data (e.g., environmental data for a zone, a building, etc.) from devices 962 and/or send commands to devices 962. In some embodiments, the commands sent from HVAC device 1 to devices 962 can cause devices 962 to affect an environmental change in a building (e.g., building 10) and/or a zone (e.g., a zone of building 10).

HVAC device 1 is shown to communicate via network 508 and network 902 via network interface 912. Network interface 912 can be configured to communicate with network 508 and/or network 902. Network interface 912 can be one or more circuits configured to allow HVAC device 1 to communicate with network 508 and/or network 902. Network interface 912 can be configured to communicate via LANs, metropolitan area networks (MANs), and WANs. Network interface 912 can be configured to communicate via the Internet, Ethernet, Wi-Fi, a field bus, MODBUS, BACnet, CAN, near field communication (NFC), Zigbee, Bluetooth, and/or any other network and/or combination thereof. Network interface 912 can include one or more wired and/or wireless transceivers and/or receives (e.g., a Wi-Fi transceiver, a Bluetooth transceiver, a NFC transceiver, a cellular transceiver, etc.).

In some embodiments, network interface 912 includes one or more processing circuits and/or memory devices. In some embodiments, network interface 912 is wholly and/or partially part of processing circuit 914. In this regard, network interface 912 and/or processing circuit 914 can include computer instructions necessary for communicating with network 508 and/or network 902.

Processing circuit 914 is shown to include a processor 916 and memory 918. Processor 916 can be a general purpose or specific purpose processor, an application specific integrated circuit (ASIC), one or more field programmable gate arrays (FPGAs), a group of processing components, or other suitable processing components. Processor 916 can be configured to execute computer code and/or instructions stored in memory 918 or received from other computer readable media (e.g., CDROM, network storage, a remote server, etc.).

Memory 918 can include one or more devices (e.g., memory units, memory devices, storage devices, etc.) for storing data and/or computer code for completing and/or facilitating the various processes described in the present disclosure. Memory 918 can include random access memory (RAM), read-only memory (ROM), hard drive storage, temporary storage, non-volatile memory, flash memory, optical memory, or any other suitable memory for storing software objects and/or computer instructions. Memory 918 can include database components, object code components, script components, or any other type of information structure for supporting the various activities and information structures described in the present disclosure. Memory 918 can be communicably connected to processor 916 via processing circuit 914 and can include computer code for executing (e.g., by processor 916) one or more processes described herein.

Memory 918 is shown to include various components for operating HVAC device 1. These various components can be executed on processor 916. Memory 918 is shown to include block controller 920, HVAC data chain 510 as described with reference to FIG. 5, key controller 932, nonce controller 926, chain verifier 956, device data updater 958, license an access controller 960, difficulty calculator 948, target time module 950, device data 934, and/or transaction and contract controller 966. License and access controller 960 can be configured to facilitate licensing for HVAC device 1 and data access from other HVAC devices. License and access controller 960 is described with further reference to FIG. 12.

Block controller 920 can be configured to generate blocks for HVAC data chain 510 and send the blocks to HVAC devices 2-6 via network 508. HVAC devices 2-6 can be configured to solve the block which block controller 920 sends them. Also, block controller 920 can be configured to attempt to solve the blocks that it generates and/or sends to HVAC devices 2-6. Block controller 920 can be configured to receive solved blocks from network 508 (e.g., HVAC devices 2-6). Block controller 920 can be configured to validate the block and then add the validated block to HVAC data chain 510. Block controller 920 is shown to include miner 922 and validator 924. Miner 922 can be configured to generate a solution for a block that block controller 920 generates and/or a block that block controller 920 receives from network 508 and/or HVAC devices 2-6. Validator 924 can be configured to receive a solved block from network 508 and/or HVAC devices 2-6. Validator 924 can be configured to verify that the block has been solved and can be configured to add the solved block to HVAC data chain 510.

Nonce controller 926 can be configured to generate a nonce value to be used by block controller 920 in solving a block. Block controller 920 can be configured to hash the nonce value with other data of the block it is trying to solve. Nonce controller 926 is shown to receive a hash from block controller 920. The hash can be the result of the nonce value hashed with the data of the block. Hash verifier 930 of nonce controller 926 can be configured to determine if the hash received from block controller 920 meets a difficulty requirement. In response to determining that the difficulty requirement has been met, hash verifier 930 may notify block controller 920 that the block has been solved and may notify block controller 920 of the nonce value that solved the block. In response to determining that the hash has not met the difficulty requirement, hash verifier 930 can cause nonce updater 928 to update the nonce value provided to block controller 920. Nonce updater 988 can update the nonce value it provides to block controller 920. Nonce updater 988 can increment and/or decrement the nonce value to be hashed by block controller 920. In some embodiments, nonce updater 988 can pseudo-randomly generate a new nonce value to be hashed with block controller 920.

Difficulty calculator 948 can be configured to determine a difficulty requirement and provide the difficulty requirement to nonce controller 926. In some embodiments, the difficulty requirement is a requirement that the hash value has a certain property or meets a certain criteria. For example, a possible difficulty requirement can be that a hash value generated by block controller 920 has zero as the first four characters of the hash. For example, a hash "ab893ab00c3" may not meet the difficulty requirement and thus may not be a solution to a particular block. However, the hash "0000aa92bbb" may meet the difficulty requirement of the block and be a valid solution for the block. Difficulty calculator 940 can be configured to increase the difficulty and/or decrease the difficulty to meet a target time. For example, difficulty calculator 940 can increase the number of zeros that must be at the beginning of a hash to be a valid solution for a block while difficulty calculator 940 can also decrease the number of zeros that must be at the beginning of a hash to be a valid solution for a block. In some embodiments, the difficulty requirement is that the hash is less than a particular number. In this regard, difficulty calculator 948 can be configured to raise or lower the particular number to increase or decrease the difficulty.

Difficulty calculator 948 can adjust the difficulty level to maintain a predefined target solution time. The solution time can be a desired time for when one of HVAC devices 1-6 publishes a block to all of HVAC devices 1-6 and one of HVAC devices 1-6 generate a hash that meets the current difficulty requirement. The average time it takes for one of the HVAC devices 1-6 to determine a solution to a block can be known as a block time. The block time can be dependent on the amount of "hashing power" (e.g., computing power) in system 500. For example, the number of devices in system 500 that are attempting to solve a hash can change over time, thus the total computing power of system 500 can change over time. To adjust to these changes, difficulty calculator 948 can be configured to adjust the difficulty to maintain a particular target time.

In some embodiments, difficulty calculator 948 receives a target time from target time module 950. In some embodiments, the target time is the amount of time for HVAC devices 1-6 to add a predefined number of blocks to HVAC data chain 510. Every predefined number of blocks, difficulty calculator 948 can be configured to determine the amount of time it took to add the predefined amount of blocks. Based on the target time, difficulty calculator 948 can be configured to raise and/or lower the difficulty.

Difficulty calculator 948 can use timers, the current block number, and/or other information to adjust the difficulty requirement. In some embodiments, all of HVAC devices 1-6 are configured to simultaneously update a difficulty requirement on each of HVAC devices 1-6 based on a commonly known target time, a commonly determined average block time, and/or a current block number. In some embodiments, the block number can be used to periodically adjust the difficulty requirement. For example, difficulty calculator 948 can adjust the difficulty requirement every 1000 blocks and/or any other predefined number.

Difficulty calculator 948 can receive a target time from target time module 950. Target time module 950 can store a particular target time. In some embodiments, the target time stored by target time module 950 is specific for the type of system 500. In some embodiments, the target time is the amount of time for HVAC devices 1-6 to add a predefined number of blocks to HVAC data chain 510. The amount of time for HVAC devices 1-6 to add a single block to HVAC data chain 510 is called the block time. Various block times and target times can be ideal for various embodiments of system 500. If system 500 is a group of controllers that control the temperature of various zones, a lower block time and target time (e.g., a lower than a predefined amount) can be ideal because the devices can need to communicate data quickly. For example, if a user requests a temperature change, the change may be affected quickly by the controllers using a lower block time and target time.

In some examples, the block time and target time for building security devices may be longer in order to make it more difficult for HVAC data chain 510 to be compromised. The block and target time for building security devices can be longer than a predefined amount (e.g., 5 minutes, 10 minutes, 20 minutes, etc.) For example, the block and target time for building security devices may be longer than the block time and target time for devices that affect an environmental change in a building. In contrast, building lighting devices may have a very quick block and target time that is shorter than a predefined amount. If system 500 connects building lighting devices and/or systems together, the block time and target time can need to be very short (e.g., a block time on the order of seconds or milliseconds).

Chain verifier 956 can be configured to verify HVAC data chain 510. Chain verifier 956 can be configured to verify each and every block of HVAC data chain 510 to verify that HVAC data chain 510 has not been compromised and/or corrupted. In some embodiments, chain verifier 956 can be configured to verify the entire HVAC data chain 510 periodically. In some embodiments, chain verifier 956 verifies HVAC data chain 510 when HVAC device 1 is booted up, when HVAC device 1 downloads and/or installs HVAC data chain 510 from one of HVAC devices 2-6, and/or when HVAC device 1 is first connected to network 508. Chain verifier 956 can be similar to validator 924. However, chain verifier 956 may not simply validate a single block, chain verifier 956 can verifier every block of HVAC data chain 510. For example, chain verifier 956 may start by verifying the first block of the HVAC data chain 510 based on signatures and/or hash solutions for the block. Chain verifier 956 can continue to verify each block from the first block to the most recent block, thus, validating the entire HVAC data chain 510.

Device data updater 958 can be configured to update device data 934 based on information stored in HVAC data chain 510. For example, blocks in HVAC data chain 510 can include a plurality of blocks, some of which can indicate that HVAC device 1 has access rights to data on one of HVAC devices 2-6. This can be stored by device data updater 958 in device data 934, access rights 952. Similarly, device data updater 958 can be configured to identify licenses in HVAC data chain 510 and update device data 934 with licensing information, licenses 964. Further, device data updater 958 can be configured to receive various commands from HVAC data chain 510. These commands can be a particular command to control one of devices 962. In some embodiments, the commands are building-wide commands, that is, they may affect all or a large portion of HVAC devices 1-6 as well as a large portion of the zones of building 10. In some embodiments, the commands can include turning off and/or cycling power of all devices at a particular time. In some embodiments, the commands may operate devices of the entire building to heat or cool the building.

Memory 918 is shown to include device data 934. Device data 934 may include information about HVAC device 1, various data retrieved from devices 926, various access information, licensing information, and/or any other information. Controller data is shown to include serial number (SN) 936. SN 936 can be a serial code that uniquely identifies HVAC device 1. Device data 934 can also include model number 938. Model number 938 can be a particular model number which identifies the type of HVAC device 1. Media access control (MAC) address 940 can be the MAC address of HVAC device 1, configuration settings 942 can be information which causes HVAC device 1 to operate in a particular manner. For example, configuration settings 942 can indicate that HVAC device 1 retrieves data from devices 962 at a particular interval, that HVAC device 1 operates HVAC devices 962 to maintain a particular environmental setpoint (e.g., temperature, humidity, air quality, etc.) in building 10 and/or a zone of building 10.

Inputs/outputs 944 can represent the inputs and/or outputs of HVAC device 1 and/or devices 963. Inputs/outputs 944 can be binary inputs and/or binary outputs. In some embodiments, inputs/outputs 944 are analog inputs and/or analog outputs. Any other attribute can be stored in device data 934. The other attributes can be a particular data point calculated form inputs/outputs 944. For example, inputs/outputs 944 can indicate that HVAC device 1 has measured a particular resistance value associated with a thermocouple of one of devices 962. The other attributes can indicate the resistance value, an equation used to convert the temperature value into a temperature, and/or the temperature associated with the resistance value. However, other data types such as valve position (e.g., analog voltage, step value, etc.), fan speed (e.g., an RPM value), compressor speed (e.g., an RPM value) and other data types may be associated with, retrieved from, and/or sent to devices 962.

Device data 934 can include commands 954. Commands 954 can be any command that HVAC device 1 is performing and/or will perform. For example, commands 954 can be a command received from one of HVAC devices 2-6. In some embodiments, command 954 is a command received via HVAC data chain 510. Control record 970 can be a record of some and/or all of the control actions performed by HVAC device 1. In some embodiments, control actions can only be significant actions. Control record 970 can be added to a block in HVAC data chain 510 so that other devices, HVAC devices 2-6 can view control record 970 of HVAC device 1. Access record 972 can be a record of all of the data access and/or control access that HVAC device 1 can have. In some embodiments, access record 972 can indicate what data access HVAC device 1 has from another device of HVAC devices 2-6 and/or has had in the past. Access record 972 can also indicate what control actions HVAC device 1 has access to send to HVAC devices 2-6. Access record 972 can be added to HVAC data chain 510 so that HVAC devices 2-6 can view what access HVAC device 1 has and/or has had in the past.

HVAC controller 968 can be configured to receive environmental data from devices 962 and control devices 962 to affect an environmental change in a zone and/or building (e.g., building 10). HVAC controller 968 can be configured to use configuration settings 942 to determine appropriate environmental setpoints (e.g., temperature setpoints, humidity setpoints, environmental setpoints) for devices 962 to use in providing environmental control of a space (e.g., a zone). Further, HVAC controller 968 can send data of device 962 to inputs/outputs 944 and/or otherwise device data 934.

Device data 934 is shown to include HVAC data 974. HVAC data 974 can be stored by memory 918 and can include environmental information regarding a building (e.g., building 10) and/or a zone of a building (e.g., building 10). In some embodiments, HVAC data 974 includes environmental data associated with HVAC device 1 and/or devices 962. HVAC data 974 can include information such as temperature trends, humidity trends, average temperature, average humidity, and/or any other HVAC related information. In some embodiments, HVAC data 974 can be energy usage of HVAC device 1 and/or HVAC devices 962. Block controller 920 can add a block to HVAC data chain 510 that includes some and/or all of the data stored in device data 934 including HVAC data 974. Since HVAC data 974 can be HVAC data related to a particular zone and/or HVAC device 1, one block of HVAC data chain 510 can include HVAC data related to HVAC device 1 and/or a particular zone. In some embodiments, all of HVAC devices 1-6 store a block relating to HVAC data pertaining to each of devices 1-6 and/or the zones that HVAC devices 1-6 are located in. For this reason, HVAC data chain 510 can store a record, based on all and/or some of the blocks of HVAC data chain 510, of HVAC data for a plurality of zones, a plurality of devices, and/or an entire building (e.g., building 10).

In some embodiments, HVAC controller 968 provides a control signal to devices 962 via network interface 912 and/or network 902. The control signal can cause the devices 962 to condition and/or heat a zone and/or building to a setpoint temperature. Further, the control signals can cause devices 962 to achieve a humidity value in a building and/or zone based on a humidity setpoint. HVAC controller 968 can use any of a variety of control algorithms (e.g., state-based algorithms, extremum-seeking control algorithms, PID control algorithms, model predictive control algorithms, feedback control algorithms, etc.) to determine appropriate control actions for devices 962 as a function of temperature and/or humidity.

Transaction and contract controller 966 can be configured to negotiate a transaction and/or contract between HVAC device 1 and one of HVAC devices 2-6. In some embodiments, the transaction and/or contract is a time limited transaction and/or contract, that is, the transaction and/or contract lasts for a predefined amount of time. In various embodiments, a contract can be an exchange of HVAC data, utilizing processing resources of one of the devices entering the contract, generating control commands for another device in the contract, etc. The transactions can be agreements to exchange data, information, and/or services. In some embodiments, the transaction is trading information and/or services between two devices. For example, HVAC device 1 can agree to send HVAC data from HVAC device 1 to HVAC device 2 if HVAC device 2 determines an appropriate energy saving environmental setpoint from the HVAC data and sends the setpoint to HVAC device 1. Any contract and/or transaction can be stored in device data 934 as contracts/transactions 946 and/or can be generated as a block for HVAC data chain 510.

Figure 10A:
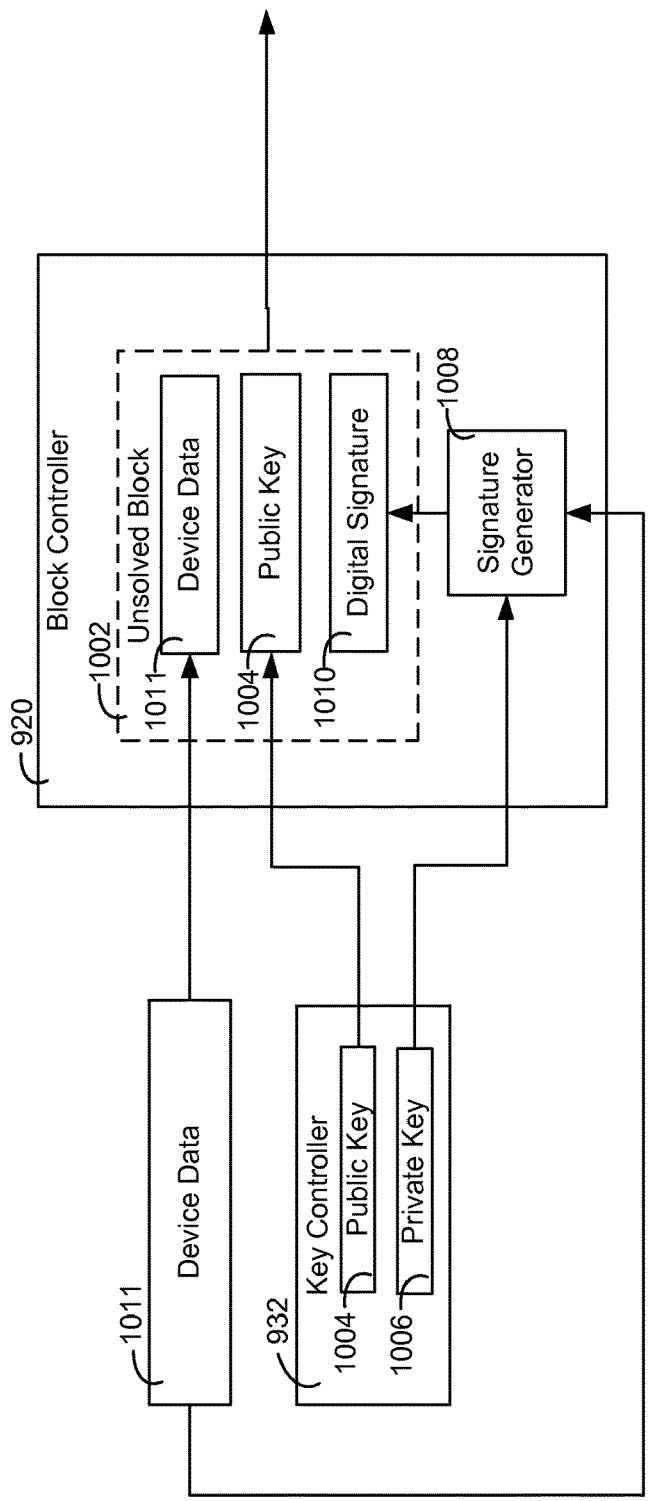
FIG. 10A is a block diagram of a block controller of the HVAC device of FIG. 9 in greater detail, according to some embodiments.

Referring now to FIG. 10A, block controller 920 of FIG. 9 is shown in greater detail, according to an exemplary embodiment. Block controller 920 is shown to receive device data 1011. Device data 1011 can include various transactions, contracts, licenses, access, and/or any other information. In some embodiments, device data 1011 is the same and/or similar to device data 926 as described with reference to FIG. 9. For example, device data 1011 can include some, all, or none of the information stored in device data 926 as described with reference to FIG. 9. Block controller 920 is also shown to receive public key 1004 and private key 1006. Public key 1004 and private key 1006 can be generated by key controller 932. Key controller 932 can be configured to generate public key 1004 and private key 1006 via various key generation techniques. In some embodiments, public key 1004 and private key 1006 are keys in a RSA, a digital signature algorithm (DSA), an elliptic curve digital signature algorithm (ECDSA), and/or any signature algorithm and/or combination thereof.

Block controller 920 can generate an unsolved block 1002 and send the unsolved block 1002 to HVAC devices 2-6 of FIG. 5 so that one of HVAC devices 2-6 can generate a solution for unsolved block 1002. Block controller 920 is shown to include signature generator 1008. Signature generator 1008 is shown to receive private key 1006 and device data 934. In some embodiments, signature generator 1008 generates digital signature 1010 based on private key 1006 and device data 934. In various embodiments, signature generator 1008 generates a hash value of device data 934 and/or a hash value of each element of device data 934 (e.g., generate a merkleroot) and signs the generated hash value with the private key 1006. In some embodiments, signature generator 1008 signs the generated hash with a public key of a particular HVAC device of HVAC devices 2-6. This may be used for a transaction. For example, in a transaction, the second party may be identified in the signature generated by the first party since their public key is used when signing the transaction.

Block controller 920 is configured to include digital signature 1010 and public key 1004 in unsolved block 1002. One of HVAC devices 2-6 that receives unsolved block 1002 can validate the authenticity of unsolved block 1002, that is, determine that unsolved block 1002 was generated by the owner of private key 1006 (i.e., HVAC device 1) by using public key 1004, device data 934, and digital signature 1010. In some embodiments, digital signature 1010 verifies that device data 1011 is correct. For example, if device data 1011 includes access for a particular device to access device data of HVAC device 1, a transaction, or a contract, etc., other devices can verify that device data 1011 is authentic.

Figure 10B:
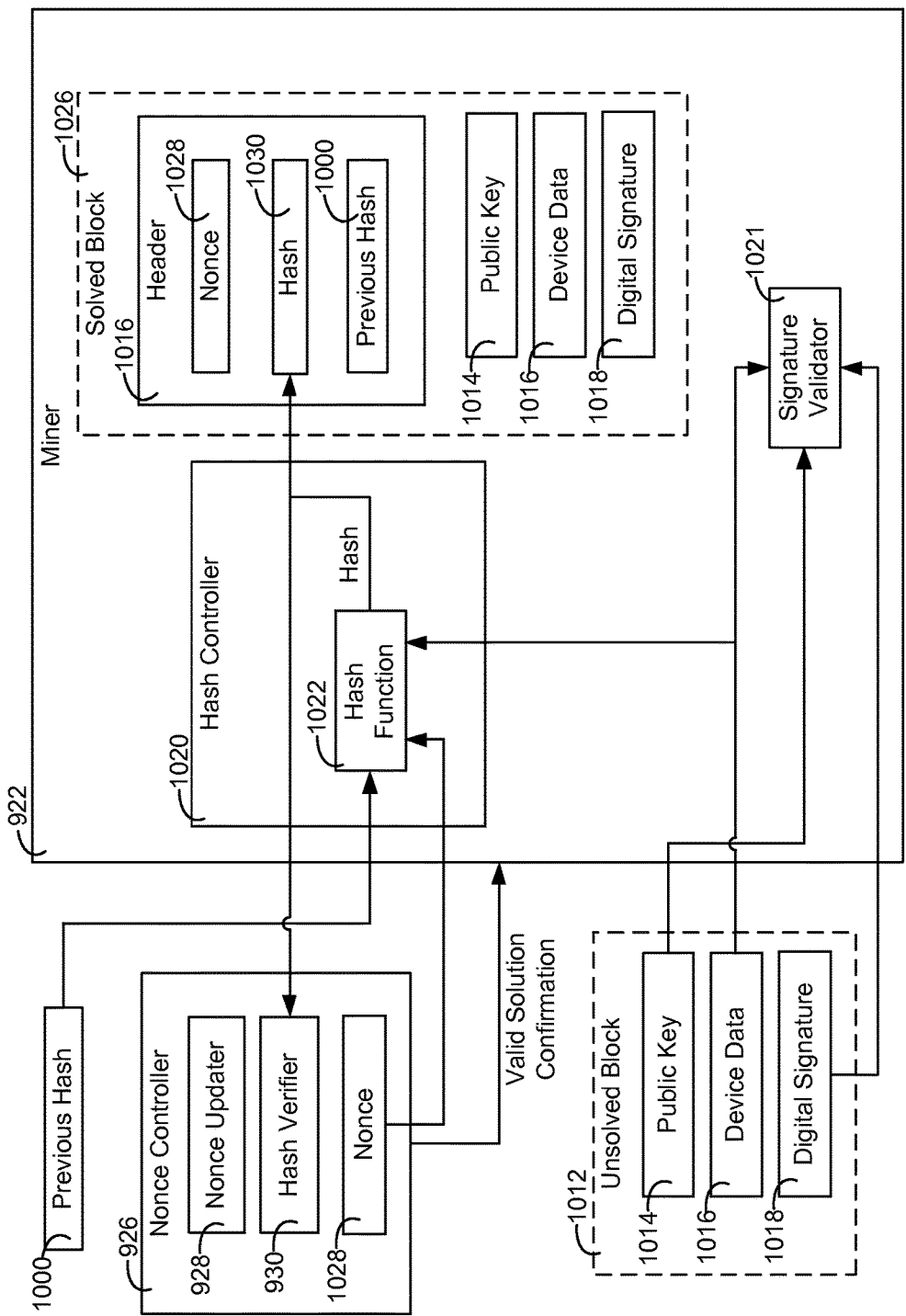
FIG. 10B is a block diagram of components the HVAC device of FIG. 9 that generate a hash solution for a block, according to some embodiments.

Referring now to FIG. 10B, miner 922 of FIG. 9 is shown in greater detail, according to some embodiments. Miner 922 is shown to include hash controller 1020 that is shown to generate solved block 1026 from unsolved block 1012. Unsolved block 1012 can be an unsolved block generated by one of HVAC devices 1-6. For example, HVAC device 1 can generate unsolved block 1012 and then attempt to solve unsolved block 1012. Further, HVAC device 1 can receive unsolved block 1012 from one of HVAC devices 2-6 and/or license server 608 via network 508. Generating an unsolved block 1012 is described in FIG. 10A.

Miner 922 is shown to include signature validator 1021 that is configured to verify the authenticity of unsolved block 1012 and/or the contents of bock 1012 (e.g., device data 1016) with algorithms such as RSA, DSA, ECDSA, and/or any other algorithm. Signature validator 1021 is shown to receive public key 1014, device data 1016, and digital signature 1018 of unsolved block 1012. Signature validator 1021 can be configured to generate a Boolean value indicating that unsolved block 1012 is authentic or is not authentic. In some embodiments, when the block includes a transaction, signature validator 1021 may validate the transaction with the public key of both parties in the transaction. In this regard, the signature may be a digitally signed version of the transaction that is signed with the private key and the public key of the first device performing the transaction, and the public key of the second device performing the transaction. In this regard, the transaction can be confirmed with the public keys of both parties. In response to determining that unsolved block 1012 is not authentic, miner 922 can be configured to not generate solved block 1026. In response to determining that unsolved block 1012 is authentic, miner 922 can be configured to generate and/or continue to generate solved block 1026. Signature validator 1021 can be configured to cause public key 1014, digital signature 1018, and/or device data 1016 to be included in solved block 1026.

Hash controller 1020 can be configured to generate hash 1030. Hash controller 1020 can repeatedly generate hash 1030 until hash 1030 meets a particular difficulty requirement. Hash controller 1020 is shown to include hash function 1022. Hash function 1022 can be configured to perform hashing for SHA-256, Scrypt Blake-256, CryptoNight, HEFTY1, Quart, SHA-3, SCRYP-JANE, SCRYPT-N, and/or any other hashing algorithm. In some embodiments, hash 1030 and/or previous hash 1000 are 32 byte numbers. Hash function 1022 can be configured to hash previous hash 1000, nonce 1028 and device data 1016 to generate hash 1030. Previous hash 1000 can be the previous hash solution to the most recent block added to HVAC data chain 510. By using previous hash 1000, a link can be created between solved block 1026 and the most recently added block of HVAC data chain 510.

Nonce controller 926 can adjust (e.g., increment) nonce 1028. Each time nonce 1028 is adjusted, hash controller 1020 can generate a new hash with nonce 1028. Each time hash function 1022 generates a hash, hash verifier 930 can check the generated hash 1030 to determine if hash 1030 meets a difficulty requirement as defined by difficulty calculator 948. If the hash meets the difficulty requirement, nonce controller 926 notifies miner 922 of the nonce which meets the difficulty requirement. Miner 922 can include nonce 1028 that generates the solution in header 1016. The hash meeting the difficulty requirement, hash 1030 can also be included in header 1016.

Miner 922 can be configured to include various information in header 1016. In some embodiments, all of the information in header 1016 is hashed by hash controller 1020 when generating hash 1030. In some embodiments, header 1016 includes a block number, a current time, the current difficulty, etc. This information can be hashed along with previous hash 1000, and/or device data 1016 when generating hash 1030. Header 1016 can further include previous hash 1000 of the newest (e.g., the most recently added) block in HVAC data chain 510.

Figure 11:
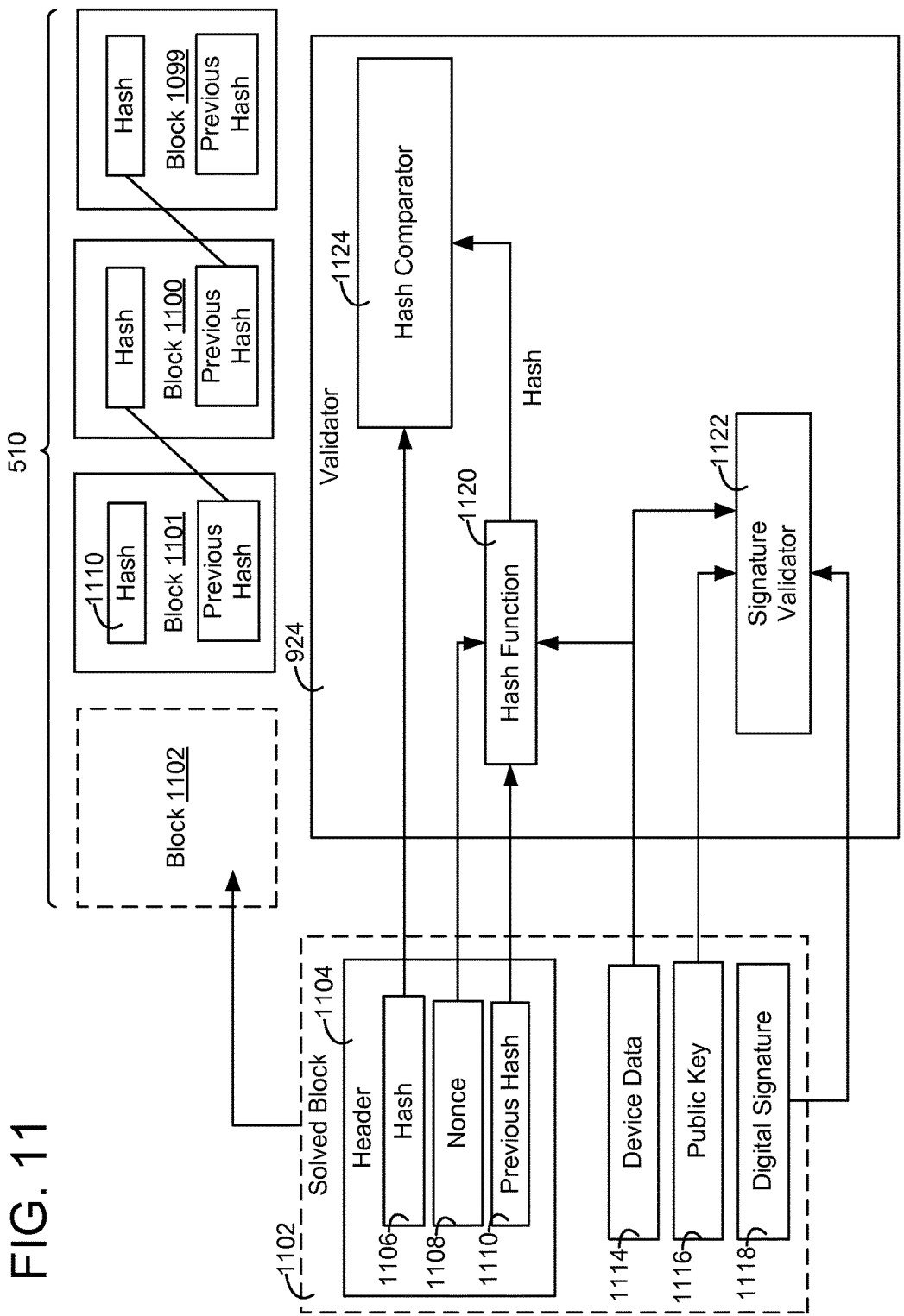
FIG. 11 is a block diagram of components of the HVAC device of FIG. 9 that validate and add a solved block to the HVAC data chain of FIG. 5, according to some embodiments.

Referring now to FIG. 11, validator 924 of HVAC device 1 of FIG. 9 is shown in greater detail, according to an exemplary embodiment. Validator 924 is shown to validate a solved block 1102 and add solved block 1102 to HVAC data chain 510. Solved block 1102 can be a block that one of HVAC devices 1-6 has generated a solution for, and has sent to the devices of system 500 to be added to the HVAC data chains (e.g., HVAC data chain 510) stored on each of HVAC devices 1-6. Solving a block is described with further reference to FIG. 10B. Solved block 1102 is shown to include header 1104, device data 1114, public key 1116, and digital signature 1118. Header 1104 can be similar to header 1016 as described with reference to FIG. 10B. Header 1104 is shown to include hash 1106, nonce 1108, and previous hash 1110. Hash 1106 can be similar to hash 1030. Hash 1106 can be the result of hashing nonce 1108, previous hash 1110, and device data 1114. Hash 1106 may be a value that meets a difficulty requirement. Previous hash 1110 can be the hash of the previous (e.g., newest) block of HVAC data chain 510. In this example, previous hash 1110 can be the hash of block 1101, hash 1126. Hash function 1120 may be the same as and/or similar to, hash function 1022 as described with reference to FIG. 10B.

Hash function 1120 can be configured to generate a hash value from nonce 1108, previous hash 1110, and device data 1114. The hash can be provided to hash comparator 1124. Hash comparator 1124 can be configured to compare the hash value generated by hash function 1120 to hash 1106. In response to determining that the hash of hash function 1120 matches hash 1106, hash comparator 1124 can be configured to add solved block 1102 to HVAC data chain 510.

Figure 12:
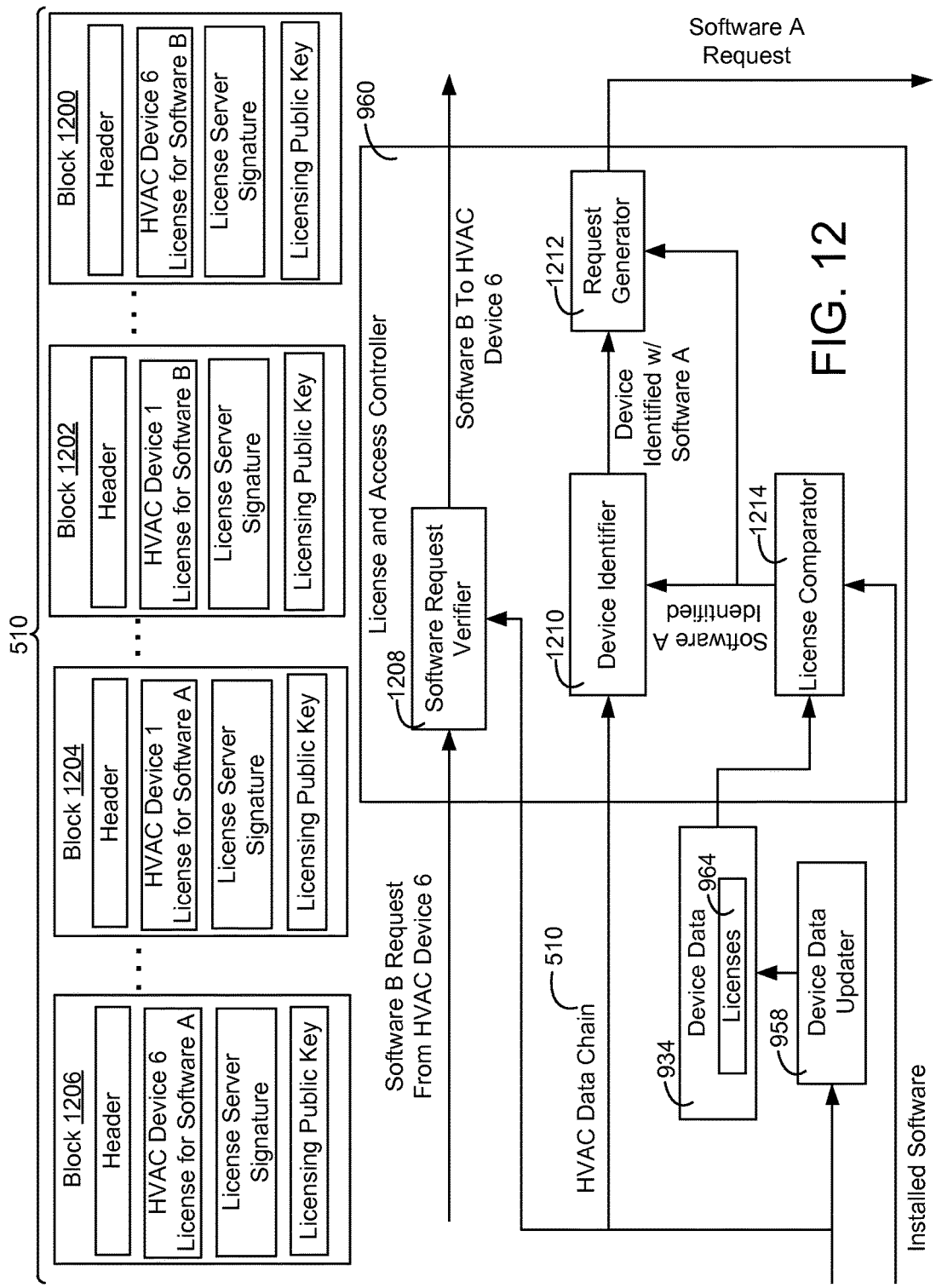
FIG. 12 is a block diagram for updating the HVAC device of FIG. 9 with software based on a software license contained in the HVAC data chain of FIG. 5, according to some embodiments.

Referring now to FIG. 12, license and access controller 960 is shown in greater detail, according to an exemplary embodiment. License and access controller 960 is shown to include device identifier 1210, request generator 1212, license comparator 1214 and software request verifier 1208.

FIG. 12 is shown to include device data updater 958 as described with reference to FIG. 9. Device data updater 958 receives HVAC data chain 510 and updates device data 934 based on the HVAC data chain 510. In some embodiments, device data updater 958 identifies that HVAC data chain 510 indicates that HVAC device 1 is licensed for a particular piece of software. For example, license server 608 can have generated a block that was added to HVAC data chain 510 that indicates that HVAC device 1 is licensed for a particular piece of software. In this regard, device data updater 958 can update licenses 964 which can store a record of all of the software licenses of HVAC device 1.

License comparator 1214 can be configured to compare the licenses 964 of device data 934 with the currently installed software on HVAC device 1. In response to determining that there is software that HVAC device 1 does not currently have installed and/or access to, license comparator 1214 can send an identification of software that HVAC device 1 is licensed to have but is not currently installed to device identifier 1210.

Device identifier 1210 can be configured to determine, based on the software identified by license comparator 1214 and HVAC data chain 510, which of HVAC devices 2-6 might have the software identified by license comparator 1214. Based on the identified devices, request generator 1212 can be configured to send a software request to the identified device. An HVAC device that may have the software may be a device that is licensed for the software by license server 608. In this regard, device identifier 1210 can be configured to determine, based on HVAC data chain 510, which HVAC devices license server 608 has granted a license to the software.

License and access controller 960 is shown to include software request verifier 1208. Software request verifier 1208 can be configured to receive a software request from one of HVAC devices 2-6 for a particular piece of software. Software request verifier 1208 can be configured to determine that the device requesting the particular software update is licensed for the software, based on HVAC data chain 510. Further, software request verifier 1208 can be configured to determine whether HVAC device 1 stores and/or has installed the requested software. In response to determining that the requesting device is licensed for the requested software and/or in response to determining that HVAC device 1 has the requested software, software request verifier 1208 can be configured to send the requested software to the requesting device.

As an example, HVAC data chain 510 indicates at block 1204 that HVAC device 1 is licensed for software A. Further, block 1206 indicates that HVAC device 6 is licensed for software A. Both blocks 1204 and 1206 are signed by license server 608 and include the licensing public key of license server 608. This confirms that license server 608 created the block and HVAC devices 1-6 can rely on the data stored in blocks 1204 and 1206. In this regard, device data updater 958 can be configured to update licenses 964 based on block 1204 indicating that HVAC device 1 is licensed for Software A. Further, device identifier 1210, based on block 1206, can be configured to determine that HVAC device 6 may store and/or have Software A installed. For this reason, request generator 1212 can be configured to send a request for Software A to HVAC device 6.

Both device data updater 958 and software request verifier 1208 can be configured to verify, based on a license server signature of each block, the license of each block, and a licensing public key, that each of blocks 1200-1206 were generated by licensing server 608. Verifying that the license originates from licensing server 608 can verify that a user has paid for a particular license and that the license is not fake.

In another example, HVAC data chain 510 indicates at block 1200 that HVAC device 6 has a license for Software B. HVAC device 6 can determine that it is licensed for software A based on block 1200. HVAC device 6 can identify another HVAC device, HVAC device 1, that has a license for Software B based on HVAC data chain 510. Specifically, HVAC device 6 can be configured to identify HVAC device 1 based on block 1202 in HVAC data chain 510. In response to determining that HVAC device 1 is licensed for Software B (based on block 1200) and thus that HVAC device 2 can have Software B (based on block 1202), HVAC device 6 can be configured to send a request to HVAC device 1 for Software B. In response to receiving a request for Software B from HVAC device 6, HVAC device 1 can be configured to determine that HVAC device 6 is licensed for Software B based on HVAC data chain 510, specifically, block 1200. In response to determining that HVAC device 6 is licensed for Software B, HVAC device 1 can be configured to send the requested software, Software B, to HVAC device 6.

Figure 13:
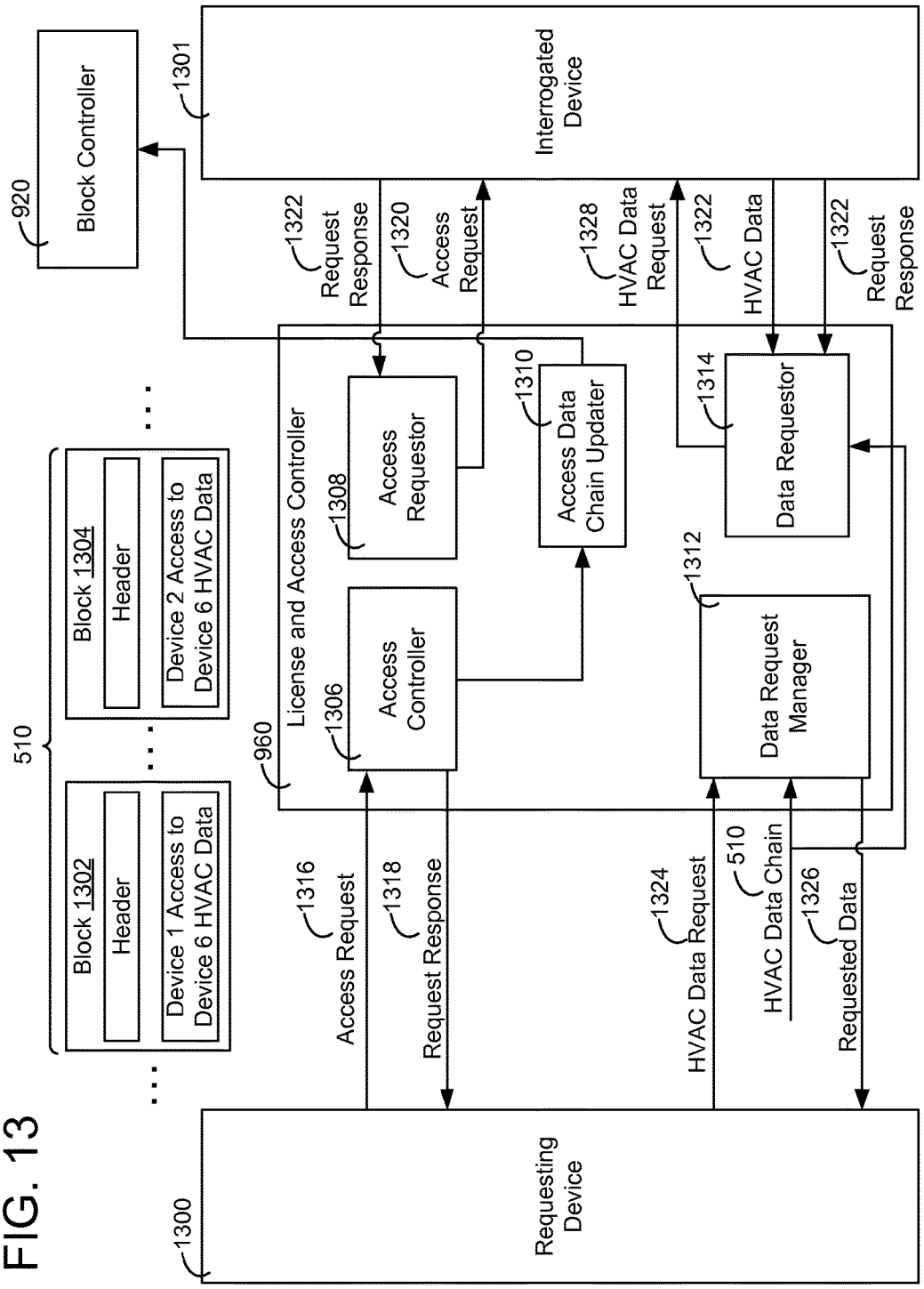
FIG. 13 is a block diagram of components of the HVAC device of FIG. 9 for granting access for HVAC data to another HVAC device of FIG. 5 based on the HVAC data chain of FIG. 5, according to some embodiments.

Referring now to FIG. 13, license and access controller 960 of HVAC device 1 is shown in greater detail, according to an exemplary embodiment. License and access controller 960 is shown to include access controller 1306, access requestor 1308, access data chain updater 1310, data request manager 1312, and data requestor 1314. License and access controller 960 is shown to communicate with block controller 920 and to receive various messages and information including HVAC data chain 510. FIG. 13 is shown to include a requesting device 1300 and an interrogated device 1301. Requesting device 1300 and interrogated device 1301 can be any device described herein such as HVAC devices 1-6. Requesting device 1300 can be a device requesting access to data of HVAC device 1 while interrogated device 1301 can be a device that HVAC device 1 is requesting access to data from. In some embodiments, requesting device 1300 and interrogated device 1301 are the same device.

In FIG. 13, access controller 1306 is shown to be configured to receive access request 1316 from requesting device 1300. The data being requested can be information such as zone and/or building temperatures, zone and/or building humidity, zone and/or building air quality, zone and/or building schedules, control of various HVAC devices that can be connected and/or controlled by HVAC device 1, and/or any other HVAC information that HVAC device 1 can store.

Access controller 1306 can determine whether to grant and/or deny access request 1316. In some embodiments, access controller 1306 can determine to grant access request 1316 based on permission settings of HVAC device 1. In some embodiments, access controller 1306 may notify a user via an email message, a text message, or a user interface of HVAC device 1 that an HVAC device has sent an access request 1316. The user can review the access request 1316 and prompt access controller 1306 to either accept and/or deny access request 1316. In response to accepting and/or denying access request 1316, access controller 1306 can be configured to send request response 1318 to the device which originally sent access request 1316. Request response 1318 can indicate that the request has been accepted and/or denied.

In response to accepting access request 1316, access data chain updater 1310 can be configured to cause block controller 920 to generate a new block to be solved and added to HVAC data chain 510. The new block can indicate that the device that sent access request 1316 is granted access to certain data and/or other information. The new block may indicate a time period for this access. For example, block 1302 of HVAC data chain 510 indicates that device 1 has access to certain HVAC data of HVAC device 6. Block 1304 of HVAC data chain 510 indicates that device 2 has access to HVAC data of HVAC device 6. Generating a new block, using a digital signature to sign the contents of the block, and solving the block, validating the block, and authenticating the device that generated the contents of the block are described with further reference to FIGS. 10A-10B, and elsewhere herein.

Data request manager 1312 can be configured to receive HVAC data request 1324 from requesting device 1300 and/or one of HVAC devices 2-6 other than requesting device 1300. HVAC data request 1324 can be a request for all data of HVAC device 1 and/or specific data of HVAC device 1. Data request manager 1312 can be configured to determine, based on HVAC data chain 510, whether requesting device 1300 has been granted access to the data requested in HVAC data request 1324. In some embodiments, one or more blocks of HVAC data chain 510 indicate that requesting device 1300 has access to the data requested in HVAC data request 1324. In response to determining that requesting device 1300 has been granted access to the data requested in HVAC data request 1324, data request manager 1312 can be configured to send the requested data 1326 to requesting device 1300.

Access requestor 1308 is shown to be configured to send access request 1320 to interrogated device 1301. Interrogated device 1301 can be configured to send request response 1322 indicating whether the access request 1320 has been accepted and/or denied. Request response 1322 can be the same and/or similar to access request 1316.

Data requestor 1314 can be configured to send a data request to one of HVAC devices 2-6 and/or interrogated device 1301. In some embodiments, data requestor 1314 can be configured to determine which of HVAC devices 2-6 have been granted access to the data requested by HVAC device 1 in access request 1320. Determining that one of HVAC devices 2-6 has access to the data can indicate that there is a high probability that that one device has the data. Data requestor 1314 can be configured to send HVAC data request 1328 to interrogated device 1301 and/or any other device of HVAC devices 2-6 that have been granted access to the data. Interrogated device 1301 and/or one of the other devices of HVAC devices 2-6 that data requestor 1314 determines may have the data can be configured to reply to HVAC data request 1328 with HVAC data 1330.

Figure 14:
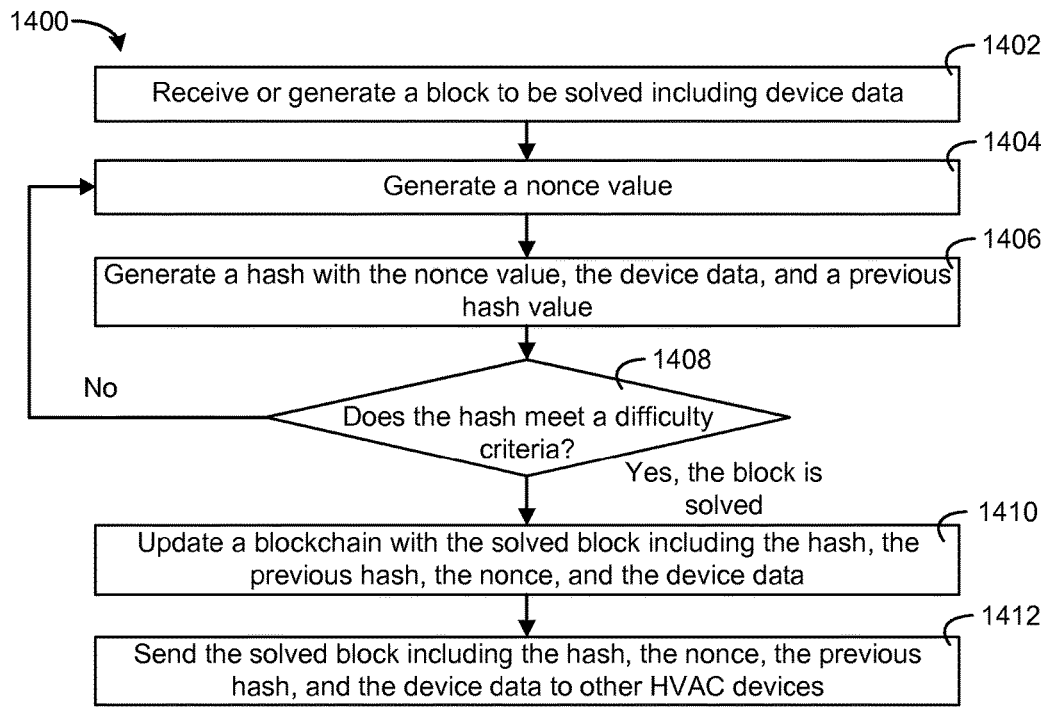
FIG. 14 is a flow diagram of a process that can be performed by the HVAC devices of FIG. 5 for solving a block and adding the block to the HVAC data chain of FIG. 5, according to some embodiments.

Referring now to FIG. 14, a process 1400 is shown for solving a block and adding the block to HVAC data chain 510, according to an exemplary embodiment. HVAC devices 1-6 of FIG. 5, license server 608 of FIG. 7, and/or any other device described herein can be configured to perform process 1400. Process 1400 is described with reference to HVAC device 1 and/or the components of HVAC device 1, however, process 1400 can be performed by any of the devices described herein and is not limited to HVAC device 1.

At 1402, block controller 920 receives a block to be solved and/or generates a new block to be solved. In some embodiments, when block controller 920 generates a new block, block controller 920 tries to solve the block and/or sends the block to HVAC devices 2-6 to be solved. The generated and/or received block can include device data such as device data 934 as described with reference to FIG. 9.

At 1404, nonce controller 926 generates a nonce value. In some embodiments, 1404 is a recurring step, that is, it takes multiple attempts to generate a nonce value that results in a solution for the block received and/or generated at 1402. In this regard, the nonce value can be incremented every iteration of steps 1404-1408. In the event that the nonce value overflows, that is, reaches its maximum value and resets to zero, nonce controller 926 can increment an extra nonce and hash the extra nonce when performing the hashing step 1406. This can allow HVAC device to attempt more solutions than the number of solutions presented by the maximum value of the nonce value generated at 1404.

At 1406, block controller 920 generates a hash value with the nonce value of step 1406, the device data, and a previous hash value. The previous hash value may be the hash solution of the previous block of HVAC data chain 510.

At 1408, block controller 920 determines if the hash value generated at 1406 meets a difficulty criteria. The difficulty criteria can be that the hash value is below a predefined value and/or that the first predefined number of entries are all zero. In response to determining that the hash meets the difficulty requirement, process 1400 proceeds to 1410. In response to determining that the hash does not meet the difficulty requirement, process 1400 proceeds to step 1404.

At 1410, block controller 920 can add the solved block to HVAC data chain 510. The solved block can include the device data received at 1402, the nonce value generated at 1404, the hash generated at 1406, and the hash value of the previous block of HVAC data chain 510. At 1412 block controller can send the solved block including the hash, the nonce, the previous hash, and the device data to other HVAC devices, such as HVAC devices 2-6. HVAC devices 2-6 can validate the solved block and add the solved block to the HVAC data chain 510 stored on each of HVAC devices 2-6 respectively.

Figure 15:
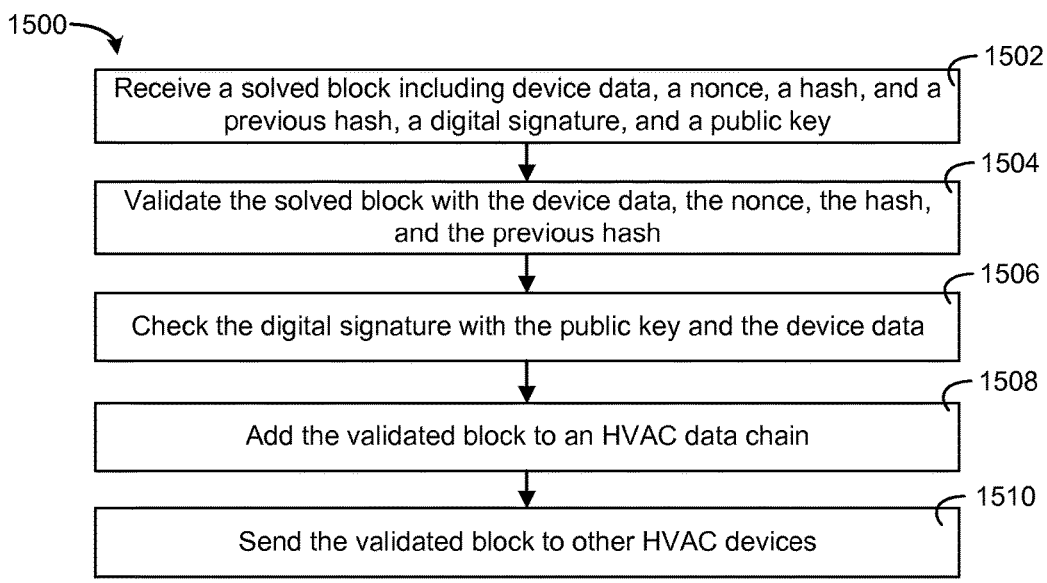
FIG. 15 is a flow diagram of a process that can be performed by the HVAC devices of FIG. 5 for validating a block and adding the validated block to the HVAC data chain of FIG. 5, according to some embodiments.

Referring now to FIG. 15, a process 1500 for validating a block and adding the block to HVAC data chain 510 is shown, according to an exemplary embodiment. HVAC devices 1-6 of FIG. 5, license server 608 of FIG. 7, and/or any other device described herein can be configured to perform process 1500. Process 1500 is described with reference to HVAC device 1 and/or the components of HVAC device 1, however, process 1500 can be performed by any of the devices described herein and is not limited to HVAC device 1.

At 1502, block controller 920 receives a solved block. The block can be a block that has been solved by one of HVAC devices 2-6. The solved block can include device data (e.g., device data 934), a nonce value, a hash value, a previous hash value, a digital signature and a public key. At 1504, block controller 920 can be configured to validate the block with the device data, the nonce, the hash, and the previous hash. In some embodiments, the previous hash is the hash of the newest (e.g., most recent) block in HVAC data chain 510. In some embodiments, block controller 820 generates a hash from the device data, the nonce, and the previous hash. Block controller 920 can compare the generated hash to the hash received at 1502 to verify that the hash received at 1502 is a valid solution for the solved block.

At 1506, block controller 920 can be configured to authenticate the solved block. The solved block can include a public key and a signature. The public key, the signature, and the device data can be used to verify the authenticity of the solved block. The particular device that originally generated the block can sign the device data with a private key and include the signature and the public key in the block. For this reason, block controller 920 can verify that the particular device actually generated the block that the block is not being "spoofed" and/or being faked by an entity other than the particular device. At 1508, block controller 920 can be configured to add the validated block to HVAC data chain 510. At 1510, block controller 920 can send the solved block to other device of HVAC devices 2-6.

Figure 16:
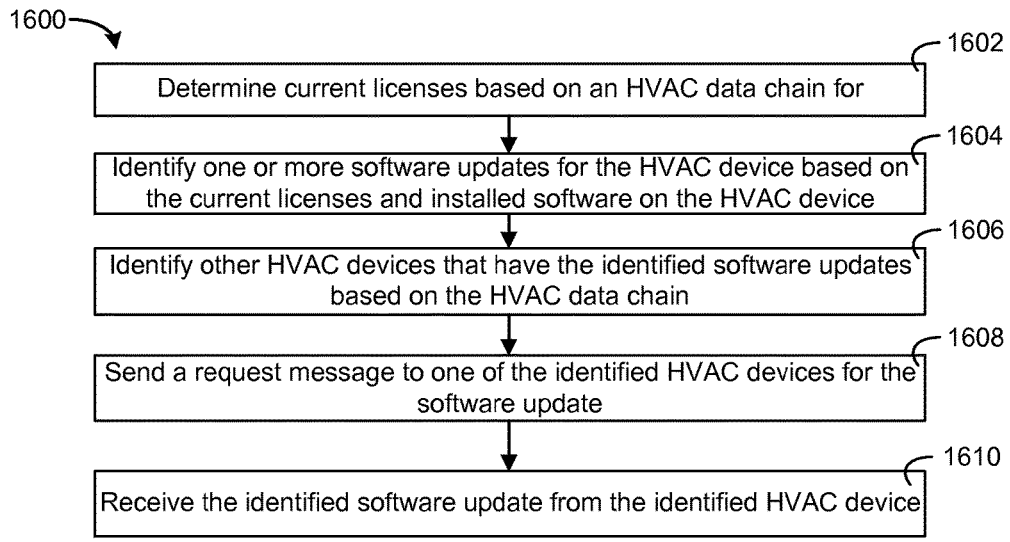
FIG. 16 is a flow diagram of a process that can be performed by the HVAC devices of FIG. 5 for determining licenses for an HVAC device and sending a software update to other HVAC devices, according to some embodiments.

Referring now to FIG. 16, a process 1600 for determining licenses for an HVAC device and sending an update to other HVAC devices is shown, according to an exemplary embodiment. HVAC devices 1-6 of FIG. 5, license server 608 of FIG. 7, and/or any other device described herein can be configured to perform process 1600. Process 1600 is described with reference to HVAC device 1 and/or the components of HVAC device 1, however, process 1600 can be performed by any of the devices described herein and is not limited to HVAC device 1.

At 1602, license and access controller 960 determines current licenses for HVAC device 1 based on HVAC data chain 510. HVAC data chain 510 can include software license blocks generated by license server 608. The authenticity of these blocks can be confirmed by HVAC devices 1-6 based on a signature of the block and a public key of licensing server 608, licensing public key 616. At 1604, based on the current licenses, license and access controller 960 can identify one or more software updates that HVAC device 1 should have based on the current licenses for HVAC device 1 and the software currently installed on HVAC device 1.

At 1606, HVAC device 1 can determine other devices that license server 608 can have licensed the identified software too based on HVAC data chain 510. At 1608, HVAC device 1 can send a request for the identified software to the other HVAC devices and/or the license server 608. At 1610, HVAC device 1 can receive the identified software update from the other HVAC devices and/or license server 608.

Figure 17:
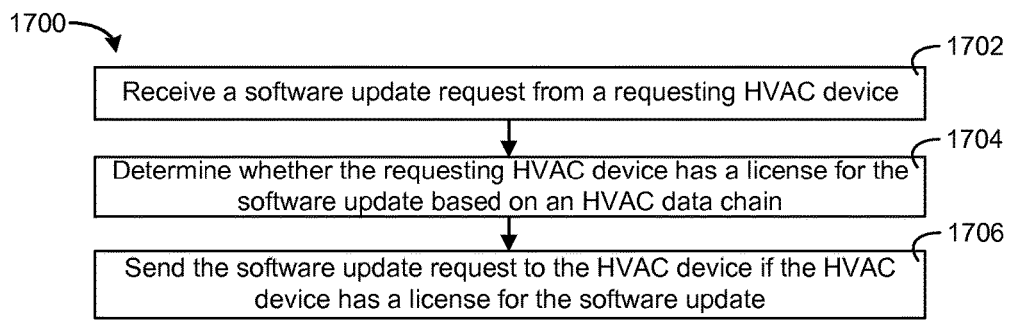
FIG. 17 is a flow diagram of a process that can be performed by the HVAC devices of FIG. 5 for validating a software request based on the HVAC data chain of FIG. 5, according to some embodiments.

Referring now to FIG. 17, a process 1700 for validating a software request based on the HVAC data chain 510 and sending a software update to the device requesting the software request is shown, according to an exemplary embodiment. HVAC devices 1-6 of FIG. 5, license server 608 of FIG. 7, and/or any other device described herein can be configured to perform process 1700. Process 1700 is described with reference to HVAC device 1 and/or the components of HVAC device 1, however, process 1700 can be performed by any of the devices described herein and is not limited to HVAC device 1.

At 1702, license and access controller 960 can receive a software update request from a requesting HVAC device. The software update request can be a request for HVAC device 1 to send the requesting HVAC device a particular software update. At 1704, license and access controller 960 can determine whether the requesting HVAC devices has been granted a license for the requested software update by license server 608 based on HVAC data chain 510. At 1706, in response to determining that the requesting HVAC device is licensed for the requested software, license and access controller 960 can be configured to send the requested software to the requesting HVAC device.

Figure 18:
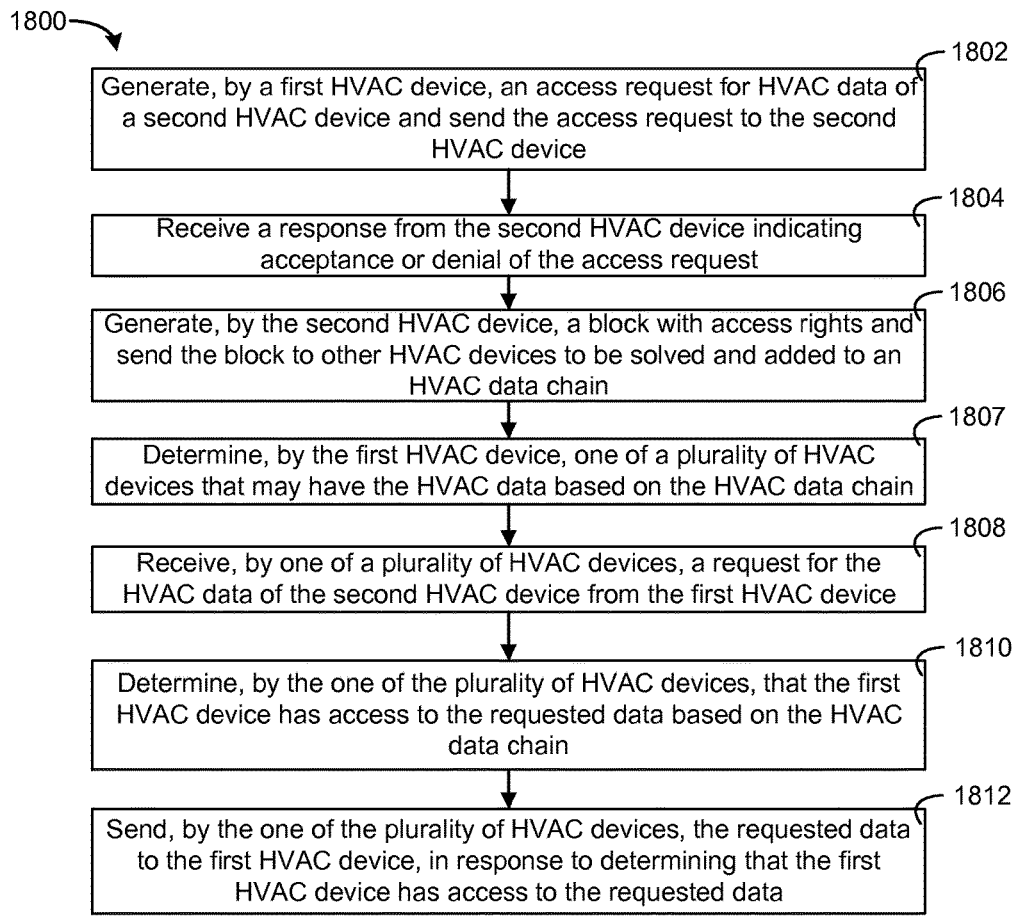
FIG. 18 is a flow diagram of a process that can be performed by the HVAC devices of FIG. 5 for facilitating data access rights between the HVAC devices of FIG. 5, according to some embodiments.

Referring now to FIG. 18, a process 1800 is shown for granting a first HVAC device access rights to HVAC data of a second HVAC device. HVAC devices 1-6 of FIG. 5, license server 608 of FIG. 7, and/or any other device described herein can be configured to perform process 1700. Process 1800 is described with reference to HVAC device 1 and/or the components of HVAC device 1, however, process 1800 can be performed by any of the devices described herein and is not limited to HVAC device 1. The first HVAC device, the second HVAC device, the one of the plurality of HVAC devices, and the plurality of HVAC devices can be HVAC devices 1-6, license server 608, and/or any other device described herein.

At 1802, the first HVAC device can generate an access request message for HVAC data of a second HVAC device and send the access request to the second HVAC device. At 1804, the second HVAC device can send a response to the first HVAC device. The response can indicate that the second HVAC device has granted the first HVAC device access to the requested HVAC data.

At 1806, the second HVAC device can add a block with access rights for the second HVAC device to the HVAC data requested at 1802 to HVAC data chain 510 by sending the block to other HVAC devices to be solved. At 1807, the first HVAC device can determine one of a plurality of HVAC devices that can have the HVAC data based on HVAC data chain 510. In some embodiments, the first HVAC device determines that the one of the plurality of HVAC devices has access to the HVAC device data that the first HVAC device also has access to. In this regard, it is possible that the one of the plurality of HVAC devices is currently storing the HVAC data of the second HVAC device.

At 1808, one of a plurality of HVAC devices can receive a request for HVAC data of the second HVAC device from the first HVAC device. At 1810, based on the HVAC data chain and the block generated by the second HVAC device at 1806, the one of the plurality of HVAC devices can determine whether the first device has access to the HVAC data of the second HVAC device. At 1812, in response to determining that the first HVAC device has access to the HVAC data of the HVAC device, the one of the plurality of HVAC devices can send the requested HVAC data of the second device to the first HVAC device if the one of the plurality of HVAC devices stores the HVAC data of the second HVAC device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for securely communicating and storing information in a building system of a building, the system comprising:
 a plurality of building devices communicably coupled via a network, wherein each of the plurality of building devices are configured to store a copy of a blockchain comprising a plurality of blocks linked sequentially, wherein the plurality of building devices comprise a first building device comprising a processing circuit, the processing circuit comprising one or more memory devices and one or more processors, the processing circuit configured to:
  generate a first block comprising device data and send the first block to at least a portion of the plurality of building devices;
  receive a second block from a second building device of the plurality of building devices;
  solve the second block by determining a nonce value that causes a hash of data, the nonce value, and a previous hash of a newest block in the blockchain to meet a difficulty requirement;
  add the solved block to the blockchain of the first building device as the newest block, wherein the blockchain of the first building device comprises one or more licensing blocks indicating license information for software of a respective one or more of the plurality of building devices; and
  send the solved block to at least one of the plurality of building devices to be added as the newest block in the blockchain stored on at least one of the plurality of building devices, wherein the solved block comprises the different device data and the determined nonce value.

2. The system of claim 1, wherein the plurality of blocks comprise device data associated with a plurality of zones of the building associated with the building system;
 wherein the blockchain further comprises, based on the plurality of blocks, a record of device data for the building.

3. The system of claim 1, wherein the processing circuit of the first building device and a processing circuit of the second building device are configured to determine an operating contract for the first building device and the second building device;
 wherein the processing circuit of the first building device is configured to:
  generate a block comprising the operating contract; and send the block comprising the operating contract to the plurality of building devices to be solved and added to the blockchain.

4. The system of claim 1, wherein the first block generated by the processing circuit of the first building device further comprises a digital signature and a public key;
wherein the processing circuit of the first building device is configured to generate the digital signature for the first block with a private key and the device data;
wherein the second block further comprises a second public key and a second digital signature, wherein the processing circuit of the first building device is configured to verify authenticity of the second block with the different device data, the second digital signature, and the second public key.

5. The system of claim 1, wherein the processing circuit of the first building device is configured to periodically update the difficulty requirement based on a target time, wherein the target time is an amount of time for the plurality of building devices to solve a predefined number of blocks;
wherein the target time is based on the plurality of building devices being building security devices, building lighting devices, and devices that affect an environmental change in the building.

6. The system of claim 1, wherein the system further comprises a licensing server comprising a processing circuit configured to:
receive a purchase for a software license for the software for the first building device;
generate a block comprising the software license for the first building device in response to receiving the purchase for the software license for the first building device; and
send the block comprising the software license for the first building device to the plurality of building devices to be added to the blockchain stored on the plurality of building devices.

7. The system of claim 6, wherein the processing circuit of the first building device is configured to identify the software license based on the blockchain.

8. The system of claim 7, wherein the processing circuit of the first building device is further configured to perform, in response to identifying the software license, at least one of:
identifying the second building device licensed for the software based on the blockchain and send a request message to the second building device for the software; and
sending the request message for the software to the licensing server.

9. The system of claim 8, wherein the second building device comprises a processing circuit configured to:
receive the request message from the first building device;
determine that the first building device is licensed for the software based on the blockchain indicating that the first building device is licensed for the software; and
send the software to the first building device in response to determining that the blockchain indicates that the first building device is licensed for the software.

10. The system of claim 1, wherein the processing circuit of the first building device is configured to:
generate an access request for device data of the second building device; and
send the access request for the device data to the second building device;
wherein the second building device comprises a processing circuit configured to:
receive the access request from the first building device;
generate a block authorizing the first building device to request the device data of the second building device; and
send the block authorizing the first building device to request the device data of the second building device to the plurality of building devices to be solved and added to the blockchain stored on the plurality of building devices;
wherein the processing circuit of the first building device is further configured to send a request for the device data to the second building device in response to determining that the first building device is authorized to receive the device data.

11. The system of claim 10, wherein the processing circuit of the first building device is configured to:
identify one of the plurality of building devices that have access to the device data based on the blockchain;
send a second request for the device data to the identified building device; and
receive the device data from the identified building device;
wherein the identified building device comprises a processing circuit configured to:
receive the second request for the device data from the first building device;
determine that the first building device has access to the device data based on the blockchain; and
send the device data to the first building device in response to determining that the first building device has access to the device data of the second building device.

12. A method for securely communicating and storing information among a plurality of building devices in a building system of a building, the method comprising:
generating, by a first building device, a first block comprising device data, wherein the first building device is one of the plurality of building devices;
sending, by the first building device, the first block to at least a portion of the plurality of building devices;
receiving, by the first building device, a second block from a second building device of the plurality of building devices;
solving, by the first building device, the second block by determining a nonce value that causes hashing data, the nonce value, and a previous hash of a newest block in a blockchain to meet a difficulty requirement, wherein each of the plurality of building devices are configured to store the blockchain that comprises a plurality of blocks linked sequentially;
adding, by the first building device, the solved block to the blockchain of the first building device as the newest block, wherein the blockchain of the first building device comprises one or more licensing blocks indicating license information for software of a respective one or more of the plurality of building devices;
sending, by the first building device, the solved block to each of the plurality of building devices to be added to the blockchain stored on at least one of the plurality of building devices to be added as the newest block, wherein the solved block comprises the different device data and the determined nonce value.

13. The method of claim 12, wherein the plurality of blocks comprise device data associated with a plurality of zones of the building associated with the building system;

wherein the blockchain further comprises, based on the plurality of blocks, a record of device data for the building;

wherein the plurality of blocks further comprise licensing information for the plurality of building devices;

wherein the blockchain further comprises, based on the plurality of blocks comprising the licensing information, a record of licensing information for the plurality of building devices.

14. The method of claim 12, further comprising:

determining, by the first building device and the second building device, an operating contract for the first building device and the second building device;

generating, by the first building device, a block comprising the operating contract; and sending, by the first building device, the block comprising the operating contract to the plurality of building devices to be added to the blockchain stored on the plurality of building devices.

15. The method of claim 12, wherein the first block further comprises a digital signature and a public key, wherein the method further comprises generating, by the first building device, the digital signature for the first block with a private key and the device data;

wherein the second block further comprises a second public key and a second digital signature, wherein the method further comprises verifying, by the first building device, authenticity of the second block with the different device data, the second digital signature, and the second public key.

16. The method of claim 12, further comprising periodically updating, by the first building device, the difficulty requirement based on a target time, wherein the target time is an amount of time for the plurality of building devices to solve a predefined amount of blocks;

wherein the target time is based on the plurality of building devices being building security devices, building lighting devices, and devices that affect an environmental change in the building.

17. The method of claim 12, wherein the method further comprises:

receiving, by a license server, a purchase for a software license for the software for the first building device;

generating, by the license server, a block comprising the software license for the first building device in response to receiving the purchase for the software license for the first building device;

sending, by the license server, the block comprising the software license for the first building device to the plurality of building devices to be solved and added to the blockchain stored on the plurality of building devices;

identifying, by the first building device, the software license based on the blockchain; and sending, by the first building device, a request message for the software to the license server.

18. The method of claim 12, the method further comprising:

generating, by the first building device, an access request for device data of the second building device;

sending, by the first building device, the access request for the device data to the second building device;

receiving, by the second building device, the access request from the first building device;

generating, by the second building device, a block authorizing the first building device to request the device data of the second building device;

sending, by the first building device, the block to the plurality of building devices to be solved and added to the blockchain stored on the plurality of building devices; and sending, by the first building device, a request for the device data to the second building device.

19. The method of claim 18, the method further comprising:

identifying, by the first building device, one of the plurality of building devices that have access to the device data based on the blockchain;

sending, by the first building device, a second request for the device data to the identified building device;

receiving, by the identified building device, the second request for the device data from the first building device;

determining, by the identified building device, that the first building device has access to the device data based on the blockchain;

sending, by the identified building device, the device data to the first building device in response to determining that the first building device has access to the device data of the second building device; and receiving, by the first building device, the device data from the one of the plurality of building devices.

20. A system for securely communicating and storing information in a building system of a building, the system comprising:

a plurality of building devices communicably coupled via a network, wherein each of the plurality of building devices are configured to store a copy of a blockchain comprising a plurality of blocks linked sequentially, wherein the plurality of building devices comprise a first building device comprising a processing circuit, the processing circuit comprising one or more memory devices and one or more processors, the processing circuit configured to:

generate a first block comprising device data, a public key, and a digital signature, wherein the digital signature is generated based on the device data and a private key;

send the first block to at least a portion of the plurality of building devices;

receive a second block from a second building device, wherein the second block comprises different device data, a second public key, and a second digital signature;

verify authenticity of the second block with the different device data, the second digital signature, and the second public key;

solve the second block by determining a nonce value that causes hashing the different device data, the nonce value, and a previous hash of a newest block in the blockchain to meet a difficulty requirement;

add the solved block to the blockchain of the first building device as the newest block, wherein the blockchain of the first building device comprises one or more licensing blocks indicating license information for software of a respective one or more of the plurality of building devices; and send the solved block to the plurality of building devices to be added by each of the plurality of building devices as the newest block in the blockchain stored on each of the plurality of building devices, wherein the solved block comprises the different device data and the determined nonce value.

21. The system of claim 20, wherein the plurality of blocks comprise device data associated with a plurality of zones of the building associated with the building system;
- wherein the blockchain further comprises, based on the plurality of blocks, a record of device data for the building;
- wherein the plurality of blocks further comprise licensing information for the plurality of building devices;
- wherein the blockchain further comprises, based on the plurality of blocks comprising the licensing information, a record of licensing information for the plurality of building devices.

22. The system of claim 20, wherein the processing circuit of the first building device is configured to periodically update the difficulty requirement based on a target time, wherein the target time is an amount of time for the plurality of building devices to solve a predefined amount of blocks;
- wherein the target time is based on the plurality of building devices being building security devices, building lighting devices, and devices that affect an environmental change in the building.

23. The system of claim 20, wherein the processing circuit of the first building device and a processing circuit of the second building device of the plurality of building devices are configured to determine an operating contract for the first building device and the second building device; and
- wherein the processing circuit of the first building device is configured to generate a block comprising the operating contract; and
- send the block comprising the operating contract to the plurality of building devices to be solved and added to the blockchain stored on the plurality of building devices.

24. The system of claim 20, wherein the system further comprises a licensing server comprising a processing circuit configured to:
- receive a purchase for a software license for the software for the first building device;
- generate a block comprising the software license for the first building device in response to receiving the purchase for the software license for the first building device; and
- send the block comprising the software license for the first building device to the plurality of building devices to be solved and added to the blockchain stored on the plurality of building devices;
- wherein the processing circuit of the first building device is configured to identify the software license based on the blockchain;
- wherein the processing circuit of the first building device is further configured to perform at least one of:
  - identify the second building device licensed for the software based on the blockchain and send a request message to the second building device for the software; and
  - send the request message for the software to the licensing server; wherein a processing circuit of the second building device is configured to:
  - receive the request message from the first building device;
  - determine that the first building device is licensed for the software based on the blockchain indicating that the first building device is licensed for the software; and
  - send the software to the first building device in response to determining that the blockchain indicates that the first building device is licensed for the software.

* * * * *